(12) United States Patent
Elias et al.

(10) Patent No.: US 7,932,897 B2
(45) Date of Patent: Apr. 26, 2011

(54) METHOD OF INCREASING THE SPATIAL RESOLUTION OF TOUCH SENSITIVE DEVICES

(75) Inventors: John Greer Elias, Townsend, DE (US); Wayne Carl Westerman, San Francisco, CA (US); James Edmund Orr, IV, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 699 days.

(21) Appl. No.: 11/203,692

(22) Filed: Aug. 15, 2005

(65) Prior Publication Data
US 2006/0032680 A1 Feb. 16, 2006

Related U.S. Application Data

(60) Provisional application No. 60/522,107, filed on Aug. 16, 2004.

(51) Int. Cl.
*G06F 3/045* (2006.01)
(52) U.S. Cl. ...................................................... 345/174
(58) Field of Classification Search .......... 345/173–174; 178/18.03, 18.06, 20.01–20.04, 18.01, 18.05
See application file for complete search history.

(56) References Cited

U.S. PATENT DOCUMENTS

| 1,061,578 | A | 5/1913 | Wischhusen et al. |
| 2,063,276 | A | 12/1936 | Thomas |
| 2,798,907 | A | 7/1957 | Schneider |
| 2,903,229 | A | 9/1959 | Landge |
| 2,945,111 | A | 7/1960 | McCormick |
| 3,005,055 | A | 10/1961 | Mattke |
| 3,333,160 | A | 7/1967 | Gorski |
| 3,541,541 | A | 11/1970 | Englebart |
| 3,662,105 | A | 5/1972 | Hurst et al. ...................... 178/18 |
| 3,798,370 | A | 3/1974 | Hurst ................................ 178/18 |
| 3,965,399 | A | 6/1976 | Walker et al. |
| 3,996,441 | A | 12/1976 | Ohashi |
| 4,029,915 | A | 6/1977 | Ojima |
| 4,103,252 | A | 7/1978 | Bobick |
| 4,110,749 | A | 8/1978 | Janko et al. |
| 4,115,670 | A | 9/1978 | Chandler |

(Continued)

FOREIGN PATENT DOCUMENTS

CA 1243096 10/1988 .................... 340/180

(Continued)

OTHER PUBLICATIONS

Search Report and Written Opinion in corresponding PCT application No. PCT/US2005/029270 dated Dec. 1, 2006.

(Continued)

*Primary Examiner* — Chanh Nguyen
*Assistant Examiner* — Allison Walthall
(74) *Attorney, Agent, or Firm* — Morrison & Foerster LLP (57) ABSTRACT

Disclosed herein is a capacitive touch sensitive device. One aspect of the touch sensitive device described herein is a reduction in the number of sensor circuits needed for circular or linear capacitive touch sensitive devices while maintaining the same resolution and absolute position determination for a single object. A related aspect of the touch sensitive device described herein a coding pattern that allows each sensor circuit of a capacitive touch sensitive device to share multiple electrodes at specially chosen locations in a sensor array such that the ability to determine the absolute position of a single object over the array is not compromised.

20 Claims, 1 Drawing Sheet

U.S. PATENT DOCUMENTS

| | | | |
|---|---|---|---|
| 4,121,204 A | 10/1978 | Welch et al. | |
| 4,129,747 A | 12/1978 | Pepper | |
| 4,158,216 A | 6/1979 | Bigelow | |
| 4,242,676 A | 12/1980 | Piguet et al. | |
| 4,246,452 A | 1/1981 | Chandler | |
| 4,264,903 A | 4/1981 | Bigelow | |
| 4,266,144 A | 5/1981 | Bristol | |
| 4,293,734 A | 10/1981 | Pepper, Jr. | |
| D264,969 S | 6/1982 | McGoutry | |
| 4,338,502 A | 7/1982 | Hashimoto et al. | |
| 4,380,007 A | 4/1983 | Steinegger | |
| 4,380,040 A | 4/1983 | Posset | |
| 4,475,008 A | 10/1984 | Doi et al. | |
| 4,550,221 A | 10/1985 | Mabusth | 178/18 |
| 4,570,149 A | 2/1986 | Thornburg et al. | |
| 4,583,161 A | 4/1986 | Gunderson et al. | |
| 4,587,378 A | 5/1986 | Moore | |
| 4,604,786 A | 8/1986 | Howie, Jr. | |
| 4,613,736 A | 9/1986 | Shichijo et al. | |
| 4,644,100 A | 2/1987 | Brenner et al. | |
| 4,672,364 A | 6/1987 | Lucas | 340/365 P |
| 4,672,558 A | 6/1987 | Beckes et al. | 364/518 |
| 4,692,809 A | 9/1987 | Beining et al. | 358/247 |
| 4,695,827 A | 9/1987 | Beining et al. | 340/365 P |
| 4,719,524 A | 1/1988 | Morishima et al. | |
| 4,733,222 A | 3/1988 | Evans | 340/365 C |
| 4,734,034 A | 3/1988 | Maness et al. | |
| 4,734,685 A | 3/1988 | Watanabe | 340/710 |
| 4,736,191 A | 4/1988 | Matzke et al. | |
| 4,739,191 A | 4/1988 | Puar | |
| 4,739,299 A | 4/1988 | Eventoff et al. | |
| 4,746,770 A | 5/1988 | McAvinney | 178/18 |
| 4,752,655 A | 6/1988 | Tajiri et al. | |
| 4,755,765 A | 7/1988 | Ferland | |
| 4,764,717 A | 8/1988 | Tucker et al. | |
| 4,771,139 A | 9/1988 | DeSmet | |
| 4,771,276 A | 9/1988 | Parks | 340/712 |
| 4,788,384 A | 11/1988 | Bruere-Dawson et al. | 178/18 |
| 4,798,919 A | 1/1989 | Miessler et al. | |
| 4,806,846 A | 2/1989 | Kerber | 324/60 CD |
| 4,810,992 A | 3/1989 | Eventoff | |
| 4,822,957 A | 4/1989 | Talmage, Jr. et al. | |
| 4,831,359 A | 5/1989 | Newell | |
| 4,849,852 A | 7/1989 | Mullins | |
| 4,856,993 A | 8/1989 | Maness et al. | |
| 4,860,768 A | 8/1989 | Hon et al. | |
| 4,866,602 A | 9/1989 | Hall | |
| 4,876,524 A | 10/1989 | Jenkins | |
| 4,897,511 A | 1/1990 | Itaya et al. | |
| 4,898,555 A | 2/1990 | Sampson | 445/22 |
| 4,914,624 A | 4/1990 | Dunthorn | |
| 4,917,516 A | 4/1990 | Retter | |
| 4,943,889 A | 7/1990 | Ohmatoi | |
| 4,951,036 A | 8/1990 | Grueter et al. | |
| 4,954,823 A | 9/1990 | Binstead | |
| 4,968,877 A | 11/1990 | McAvinney et al. | 250/221 |
| 4,976,435 A | 12/1990 | Shatford et al. | |
| 4,990,900 A | 2/1991 | Kikuchi | |
| 5,003,519 A | 3/1991 | Noirjean | 368/73 |
| 5,008,497 A | 4/1991 | Asher | |
| 5,017,030 A | 5/1991 | Crews | 400/485 |
| 5,036,321 A | 7/1991 | Leach et al. | |
| 5,053,757 A | 10/1991 | Meadows | |
| 5,086,870 A | 2/1992 | Bolduc | |
| 5,125,077 A | 6/1992 | Hall | |
| 5,159,159 A | 10/1992 | Asher | |
| 5,178,477 A | 1/1993 | Gambaro | 400/489 |
| 5,179,648 A | 1/1993 | Hauck | |
| 5,186,646 A | 2/1993 | Pederson | |
| 5,189,403 A | 2/1993 | Franz et al. | 340/711 |
| 5,192,082 A | 3/1993 | Inoue et al. | |
| 5,193,669 A | 3/1993 | Demeo et al. | |
| 5,194,862 A | 3/1993 | Edwards | 341/20 |
| 5,224,861 A | 7/1993 | Glass et al. | 434/35 |
| 5,231,326 A | 7/1993 | Echols | |
| 5,237,311 A | 8/1993 | Mailey et al. | |
| 5,241,308 A | 8/1993 | Young | 341/34 |
| 5,252,951 A | 10/1993 | Tannenbaum et al. | 345/156 |
| 5,278,362 A | 1/1994 | Ohashi | |
| 5,281,966 A | 1/1994 | Walsh | 341/22 |
| 5,305,017 A | 4/1994 | Gerpheide | 345/174 |
| 5,313,027 A | 5/1994 | Inoue et al. | |
| D349,280 S | 8/1994 | Kaneko | |
| 5,339,213 A | 8/1994 | O'Callaghan | |
| 5,345,543 A | 9/1994 | Capps et al. | 395/137 |
| 5,367,199 A | 11/1994 | Lefkowitz et al. | |
| 5,374,787 A | 12/1994 | Miller et al. | |
| 5,376,948 A | 12/1994 | Roberts | 345/173 |
| 5,379,057 A | 1/1995 | Clough et al. | |
| 5,398,310 A | 3/1995 | Tchao et al. | 395/144 |
| 5,404,152 A | 4/1995 | Nagai | |
| 5,408,621 A | 4/1995 | Ben-Arie | |
| 5,414,445 A | 5/1995 | Kaneko et al. | |
| 5,416,498 A | 5/1995 | Grant | |
| 5,424,756 A | 6/1995 | Ho et al. | |
| 5,432,531 A | 7/1995 | Calder et al. | |
| 5,438,331 A | 8/1995 | Gilligan et al. | |
| 5,442,742 A | 8/1995 | Greyson et al. | 395/146 |
| D362,431 S | 9/1995 | Kaneko et al. | |
| 5,450,075 A | 9/1995 | Waddington | |
| 5,453,761 A | 9/1995 | Tanaka | |
| 5,463,388 A | 10/1995 | Boie et al. | 341/33 |
| 5,463,696 A | 10/1995 | Beernink et al. | 382/186 |
| 5,473,343 A | 12/1995 | Kimmich et al. | |
| 5,473,344 A | 12/1995 | Bacon et al. | |
| 5,479,192 A | 12/1995 | Carroll, Jr. et al. | |
| 5,483,261 A | 1/1996 | Yasutake | 345/173 |
| 5,488,204 A | 1/1996 | Mead et al. | 178/18 |
| 5,494,157 A | 2/1996 | Golenz et al. | |
| 5,495,077 A | 2/1996 | Miller et al. | 178/18 |
| 5,495,566 A | 2/1996 | Kwatinetz | |
| 5,508,703 A | 4/1996 | Okamura et al. | |
| 5,508,717 A | 4/1996 | Miller | |
| 5,513,309 A | 4/1996 | Meier et al. | 395/155 |
| 5,523,775 A | 6/1996 | Capps | 345/179 |
| 5,530,455 A | 6/1996 | Gillick et al. | 345/163 |
| 5,543,588 A | 8/1996 | Bisset et al. | |
| 5,543,590 A | 8/1996 | Gillespie et al. | 178/18 |
| 5,543,591 A | 8/1996 | Gillespie et al. | 178/18 |
| 5,555,004 A | 9/1996 | Ono et al. | |
| 5,559,301 A | 9/1996 | Bryan, Jr. et al. | |
| 5,559,943 A | 9/1996 | Cyr et al. | |
| 5,561,445 A | 10/1996 | Miwa et al. | |
| 5,563,632 A | 10/1996 | Roberts | 345/173 |
| 5,563,996 A | 10/1996 | Tchao | 395/144 |
| 5,564,112 A | 10/1996 | Hayes et al. | |
| 5,565,658 A | 10/1996 | Gerpheide et al. | 178/19 |
| 5,565,887 A | 10/1996 | McCambridge et al. | |
| 5,578,817 A | 11/1996 | Bidiville et al. | |
| 5,579,036 A | 11/1996 | Yates, IV | 345/173 |
| 5,581,670 A | 12/1996 | Bier et al. | |
| 5,581,681 A | 12/1996 | Tchao et al. | 395/804 |
| 5,583,946 A | 12/1996 | Gourdol | 382/187 |
| 5,585,823 A | 12/1996 | Duchon et al. | |
| 5,589,856 A | 12/1996 | Stein et al. | |
| 5,589,893 A | 12/1996 | Gaughan et al. | |
| 5,590,219 A | 12/1996 | Gourdol | 382/202 |
| 5,592,566 A | 1/1997 | Pagallo et al. | 382/187 |
| 5,594,810 A | 1/1997 | Gourdol | 382/187 |
| 5,596,347 A | 1/1997 | Robertson et al. | |
| 5,596,694 A | 1/1997 | Capps | 395/152 |
| 5,596,697 A | 1/1997 | Foster et al. | |
| 5,598,183 A | 1/1997 | Robertson et al. | |
| 5,611,040 A | 3/1997 | Brewer et al. | |
| 5,611,060 A | 3/1997 | Belfiore et al. | |
| 5,612,719 A | 3/1997 | Beernink et al. | 345/173 |
| 5,613,137 A | 3/1997 | Bertram et al. | |
| 5,617,114 A | 4/1997 | Bier et al. | |
| 5,627,531 A | 5/1997 | Posso et al. | |
| 5,631,805 A | 5/1997 | Bonsall | 361/681 |
| 5,632,679 A | 5/1997 | Tremmel | |
| 5,633,955 A | 5/1997 | Bozinovic et al. | 381/187 |
| 5,634,102 A | 5/1997 | Capps | 395/334 |
| 5,636,101 A | 6/1997 | Bonsall et al. | 361/681 |
| 5,640,258 A | 6/1997 | Kurashima et al. | |
| 5,642,108 A | 6/1997 | Gopher et al. | 341/22 |
| 5,644,657 A | 7/1997 | Capps et al. | 382/229 |

| | | | | | | |
|---|---|---|---|---|---|---|
| 5,648,642 A | 7/1997 | Miller et al. | | 5,923,388 A | 7/1999 | Kurashima et al. |
| D382,550 S | 8/1997 | Kaneko et al. | | D412,940 S | 8/1999 | Kato et al. |
| 5,657,012 A | 8/1997 | Tait | | 5,933,102 A | 8/1999 | Miller et al. |
| 5,661,632 A | 8/1997 | Register | | 5,933,134 A | 8/1999 | Shieh ............. 345/173 |
| 5,666,113 A | 9/1997 | Logan ............. 341/34 | | 5,933,141 A | 8/1999 | Smith |
| 5,666,502 A | 9/1997 | Capps ............. 345/352 | | 5,936,619 A | 8/1999 | Nagasaki et al. |
| 5,666,552 A | 9/1997 | Greyson et al. ............. 395/802 | | 5,943,044 A | 8/1999 | Martinelli et al. ............. 345/174 |
| D385,542 S | 10/1997 | Kaneko et al. | | 5,953,000 A | 9/1999 | Weirich |
| 5,675,361 A | 10/1997 | Santilli ............. 345/168 | | 5,956,019 A | 9/1999 | Bang et al. |
| 5,675,362 A | 10/1997 | Clough et al. | | 5,959,610 A | 9/1999 | Silfvast |
| 5,677,710 A | 10/1997 | Thompson-Rohrlich ..... 345/173 | | 5,959,611 A | 9/1999 | Smailagic et al. |
| 5,689,253 A | 11/1997 | Hargreaves et al. ............. 341/22 | | 5,964,661 A | 10/1999 | Dodge |
| 5,689,285 A | 11/1997 | Asher | | 5,973,668 A | 10/1999 | Watanabe |
| 5,710,844 A | 1/1998 | Capps et al. ............. 382/317 | | 6,000,000 A | 12/1999 | Hawkins et al. |
| 5,721,849 A | 2/1998 | Amro | | 6,002,093 A | 12/1999 | Hrehor et al. |
| 5,726,687 A | 3/1998 | Belfiore et al. | | 6,002,389 A | 12/1999 | Kasser ............. 345/173 |
| 5,729,219 A | 3/1998 | Armstrong et al. | | 6,002,808 A | 12/1999 | Freeman ............. 382/288 |
| 5,729,250 A | 3/1998 | Bishop et al. ............. 345/175 | | 6,005,299 A | 12/1999 | Hengst |
| 5,730,165 A | 3/1998 | Philipp ............. 137/1 | | 6,020,881 A | 2/2000 | Naughton et al. ............. 345/327 |
| 5,736,976 A | 4/1998 | Cheung ............. 345/168 | | 6,025,832 A | 2/2000 | Sudo et al. |
| 5,741,990 A | 4/1998 | Davies ............. 84/423 R | | 6,031,518 A | 2/2000 | Adams et al. |
| 5,745,116 A | 4/1998 | Pisutha-Arnond ............. 345/358 | | 6,031,524 A | 2/2000 | Kunert ............. 345/173 |
| 5,745,716 A | 4/1998 | Tchao et al. ............. 395/350 | | 6,034,672 A | 3/2000 | Gaultier et al. |
| 5,746,818 A | 5/1998 | Yatake ............. 106/31.86 | | 6,037,882 A | 3/2000 | Levy ............. 341/20 |
| 5,748,185 A | 5/1998 | Stephan et al. | | 6,050,825 A | 4/2000 | Nichol et al. ............. 434/227 |
| 5,748,269 A | 5/1998 | Harris et al. ............. 349/58 | | 6,052,339 A | 4/2000 | Frenkel et al. ............. 368/230 |
| 5,751,274 A | 5/1998 | Davis | | 6,057,829 A | 5/2000 | Silfvast |
| 5,754,890 A | 5/1998 | Holmdahl et al. | | 6,072,494 A | 6/2000 | Nguyen ............. 345/358 |
| 5,764,066 A | 6/1998 | Novak et al. | | 6,075,533 A | 6/2000 | Chang |
| 5,764,222 A | 6/1998 | Shieh ............. 345/173 | | 6,084,574 A | 7/2000 | Bidiville |
| 5,767,457 A | 6/1998 | Gerpheide et al. ............. 178/18 | | 6,084,576 A | 7/2000 | Leu et al. ............. 345/168 |
| 5,767,842 A | 6/1998 | Korth ............. 345/168 | | D430,169 S | 8/2000 | Scibora |
| 5,777,605 A | 7/1998 | Yoshinobu et al. | | 6,097,372 A | 8/2000 | Suzuki |
| 5,786,818 A | 7/1998 | Brewer et al. | | 6,104,790 A | 8/2000 | Narayanaswami |
| 5,790,104 A | 8/1998 | Shieh ............. 345/173 | | 6,107,997 A | 8/2000 | Ure ............. 345/173 |
| 5,790,107 A | 8/1998 | Kasser et al. ............. 345/174 | | 6,122,526 A | 9/2000 | Parulski et al. |
| 5,790,769 A | 8/1998 | Buxton et al. | | 6,124,587 A | 9/2000 | Bidiville et al. |
| 5,798,752 A | 8/1998 | Buxton et al. | | 6,128,003 A | 10/2000 | Smith et al. ............. 345/157 |
| 5,802,516 A | 9/1998 | Shwarts et al. ............. 707/6 | | 6,128,006 A | 10/2000 | Rosenberg et al. |
| 5,805,144 A | 9/1998 | Scholder et al. | | 6,131,048 A | 10/2000 | Sudo et al. |
| 5,808,567 A | 9/1998 | McCloud ............. 341/20 | | 6,131,299 A | 10/2000 | Raab et al. ............. 33/503 |
| 5,808,602 A | 9/1998 | Sellers | | 6,135,958 A | 10/2000 | Mikula-Curtis et al. ...... 600/443 |
| 5,809,267 A | 9/1998 | Moran et al. ............. 395/358 | | 6,141,068 A | 10/2000 | Iijima |
| 5,812,239 A | 9/1998 | Eger | | 6,144,380 A | 11/2000 | Schwarts et al. ............. 345/350 |
| 5,812,498 A | 9/1998 | Terés | | 6,147,856 A | 11/2000 | Karidis |
| 5,815,141 A | 9/1998 | Phares | | 6,163,312 A | 12/2000 | Furuya |
| 5,821,690 A | 10/1998 | Martens et al. ............. 313/506 | | 6,166,721 A | 12/2000 | Kuroiwa et al. |
| 5,821,930 A | 10/1998 | Hansen ............. 345/340 | | 6,179,496 B1 | 1/2001 | Chou |
| 5,823,782 A | 10/1998 | Marcus et al. ............. 434/156 | | 6,181,322 B1 | 1/2001 | Nanavati |
| 5,825,351 A | 10/1998 | Tam ............. 345/173 | | D437,860 S | 2/2001 | Suzuki et al. |
| 5,825,352 A | 10/1998 | Bisset et al. ............. 345/173 | | 6,188,391 B1 | 2/2001 | Seely et al. ............. 345/173 |
| 5,825,353 A | 10/1998 | Will | | 6,188,393 B1 | 2/2001 | Shu |
| 5,828,364 A | 10/1998 | Siddiqui | | 6,191,774 B1 | 2/2001 | Schena et al. |
| 5,838,304 A | 11/1998 | Hall | | 6,198,054 B1 | 3/2001 | Janniere |
| 5,841,078 A | 11/1998 | Miller et al. | | 6,198,473 B1 | 3/2001 | Armstrong |
| 5,841,423 A | 11/1998 | Carroll, Jr. et al. | | 6,198,515 B1 | 3/2001 | Cole ............. 348/836 |
| D402,281 S | 12/1998 | Ledbetter et al. | | 6,208,329 B1 | 3/2001 | Ballare ............. 345/173 |
| 5,850,213 A | 12/1998 | Imai et al. | | 6,211,861 B1 | 4/2001 | Rosenberg et al. |
| 5,854,625 A | 12/1998 | Frisch et al. ............. 345/173 | | 6,219,038 B1 | 4/2001 | Cho |
| 5,856,645 A | 1/1999 | Norton | | 6,222,465 B1 | 4/2001 | Kumar et al. ............. 341/20 |
| 5,856,822 A | 1/1999 | Du et al. | | 6,222,528 B1 | 4/2001 | Gerpheide et al. |
| 5,859,629 A | 1/1999 | Tognazzini | | D442,592 S | 5/2001 | Ledbetter et al. |
| 5,861,875 A | 1/1999 | Gerpheide | | 6,225,976 B1 | 5/2001 | Yates et al. |
| 5,869,791 A | 2/1999 | Young | | 6,225,980 B1 | 5/2001 | Weiss et al. |
| 5,875,311 A | 2/1999 | Bertram et al. | | 6,226,534 B1 | 5/2001 | Aizawa |
| 5,880,411 A | 3/1999 | Gillespie et al. ............. 178/18.01 | | 6,227,966 B1 | 5/2001 | Yokoi |
| 5,883,619 A | 3/1999 | Ho et al. | | 6,239,790 B1 | 5/2001 | Martinelli et al. ............. 345/174 |
| 5,889,236 A | 3/1999 | Gillespie et al. | | D443,616 S | 6/2001 | Fisher et al. |
| 5,889,511 A | 3/1999 | Ong et al. | | 6,243,071 B1 | 6/2001 | Shwarts et al. ............. 345/146 |
| 5,894,117 A | 4/1999 | Kamishima | | 6,243,078 B1 | 6/2001 | Rosenberg |
| 5,898,434 A | 4/1999 | Small et al. ............. 345/348 | | 6,243,080 B1 | 6/2001 | Molne |
| 5,903,229 A | 5/1999 | Kishi | | 6,243,646 B1 | 6/2001 | Ozaki et al. |
| 5,907,152 A | 5/1999 | Dandiliker et al. | | 6,246,862 B1 | 6/2001 | Grivas et al. ............. 455/90 |
| 5,907,318 A | 5/1999 | Medina | | 6,248,017 B1 | 6/2001 | Roach |
| 5,909,211 A | 6/1999 | Combs et al. | | 6,249,606 B1 | 6/2001 | Kiraly et al. ............. 382/195 |
| 5,910,802 A | 6/1999 | Shields et al. | | 6,254,477 B1 | 7/2001 | Sasaki et al. |
| 5,914,706 A | 6/1999 | Kono | | 6,256,011 B1 | 7/2001 | Culver |
| 5,920,309 A | 7/1999 | Bisset et al. ............. 345/173 | | 6,259,491 B1 | 7/2001 | Ekedahl et al. |
| 5,923,319 A | 7/1999 | Bishop et al. ............. 345/175 | | 6,262,717 B1 | 7/2001 | Donohue et al. |

| Patent No. | Date | Name | |
|---|---|---|---|
| 6,262,785 B1 | 7/2001 | Kim | |
| 6,266,050 B1 | 7/2001 | Oh et al. | |
| 6,285,211 B1 | 9/2001 | Sample et al. | |
| 6,288,707 B1 | 9/2001 | Philipp | 345/168 |
| 6,289,326 B1 | 9/2001 | LaFleur | 705/702 |
| 6,292,178 B1 | 9/2001 | Bernstein et al. | 345/173 |
| D448,810 S | 10/2001 | Goto | |
| 6,297,795 B1 | 10/2001 | Kato et al. | |
| 6,297,811 B1 | 10/2001 | Kent et al. | |
| 6,300,946 B1 | 10/2001 | Lincke et al. | |
| 6,307,539 B2 | 10/2001 | Suzuki | |
| D450,713 S | 11/2001 | Masamitsu et al. | |
| 6,314,483 B1 | 11/2001 | Goto et al. | |
| 6,321,441 B1 | 11/2001 | Davidson et al. | |
| 6,323,845 B1 | 11/2001 | Robbins | |
| 6,323,846 B1 | 11/2001 | Westerman et al. | 345/173 |
| D452,250 S | 12/2001 | Chan | |
| 6,340,800 B1 | 1/2002 | Zhai et al. | |
| 6,347,290 B1 | 2/2002 | Bartlett | 702/150 |
| D454,568 S | 3/2002 | Andre et al. | |
| 6,357,887 B1 | 3/2002 | Novak | |
| D455,793 S | 4/2002 | Lin | |
| 6,373,265 B1 | 4/2002 | Morimoto et al. | |
| 6,373,470 B1 | 4/2002 | Andre et al. | |
| 6,377,009 B1 | 4/2002 | Philipp | 318/468 |
| 6,377,530 B1 | 4/2002 | Burrows | |
| 6,380,931 B1 | 4/2002 | Gillespie et al. | 345/173 |
| 6,396,523 B1 | 5/2002 | Segal et al. | |
| 6,411,287 B1 | 6/2002 | Scharff et al. | 345/177 |
| 6,414,671 B1 | 7/2002 | Gillespie et al. | 345/157 |
| 6,421,234 B1 | 7/2002 | Ricks et al. | 361/683 |
| 6,424,338 B1 | 7/2002 | Anderson | |
| 6,429,846 B2 | 8/2002 | Rosenberg et al. | |
| 6,429,852 B1 | 8/2002 | Adams et al. | |
| 6,452,514 B1 | 9/2002 | Philipp | 341/33 |
| 6,457,355 B1 | 10/2002 | Philipp | 73/304 |
| 6,465,271 B1 | 10/2002 | Ko et al. | |
| 6,466,036 B1 | 10/2002 | Philipp | 324/678 |
| 6,473,069 B1 | 10/2002 | Gerphelde | |
| 6,492,602 B2 | 12/2002 | Asai et al. | |
| 6,492,979 B1 | 12/2002 | Kent et al. | |
| 6,496,181 B1 | 12/2002 | Bomer et al. | |
| 6,497,412 B1 | 12/2002 | Bramm | |
| D468,365 S | 1/2003 | Bransky et al. | |
| D469,109 S | 1/2003 | Andre et al. | |
| 6,515,669 B1 | 2/2003 | Mohri | 345/474 |
| 6,525,749 B1 | 2/2003 | Moran et al. | 345/863 |
| D472,245 S | 3/2003 | Andre et al. | |
| 6,535,200 B2 | 3/2003 | Philipp | 345/168 |
| 6,543,684 B1 | 4/2003 | White et al. | 234/379 |
| 6,543,947 B2 | 4/2003 | Lee | 400/489 |
| 6,546,231 B1 | 4/2003 | Someya et al. | |
| 6,570,557 B1 | 5/2003 | Westerman et al. | 345/173 |
| 6,587,091 B2 | 7/2003 | Serpa | |
| 6,593,916 B1 | 7/2003 | Aroyan | 345/173 |
| 6,606,244 B1 | 8/2003 | Liu et al. | |
| 6,610,936 B2 | 8/2003 | Gillespie et al. | 178/18.01 |
| 6,618,909 B1 | 9/2003 | Yang | |
| 6,624,833 B1 | 9/2003 | Kumar et al. | 345/863 |
| 6,636,197 B1 | 10/2003 | Goldenberg et al. | |
| 6,639,577 B2 | 10/2003 | Eberhard | 345/102 |
| 6,639,584 B1 | 10/2003 | Li | |
| 6,640,250 B1 | 10/2003 | Chang et al. | |
| 6,650,319 B1 | 11/2003 | Hurst et al. | 345/173 |
| 6,650,975 B2 | 11/2003 | Ruffner | |
| D483,809 S | 12/2003 | Lim | |
| 6,658,773 B2 | 12/2003 | Rohne et al. | |
| 6,658,994 B1 | 12/2003 | McMillan | 99/468 |
| 6,664,951 B1 | 12/2003 | Fujii et al. | |
| 6,670,894 B2 | 12/2003 | Mehring | 341/22 |
| 6,677,927 B1 | 1/2004 | Bruck et al. | |
| 6,677,932 B1 | 1/2004 | Westerman | 345/173 |
| 6,677,934 B1 | 1/2004 | Blanchard | 345/173 |
| 6,678,891 B1 | 1/2004 | Wilcox et al. | |
| 6,686,904 B1 | 2/2004 | Sherman et al. | |
| 6,686,906 B2 | 2/2004 | Salminen et al. | |
| 6,703,550 B2 | 3/2004 | Chu | |
| 6,724,366 B2 | 4/2004 | Crawford | 345/157 |
| 6,724,817 B1 | 4/2004 | Simpson et al. | |
| 6,727,889 B2 | 4/2004 | Shaw | |
| D489,731 S | 5/2004 | Huang | |
| 6,738,045 B2 | 5/2004 | Hinckley et al. | |
| 6,750,803 B2 | 6/2004 | Yates et al. | |
| 6,757,002 B1 | 6/2004 | Oross et al. | 345/864 |
| 6,781,576 B2 | 8/2004 | Tamura | |
| 6,784,384 B2 | 8/2004 | Park et al. | |
| 6,788,288 B2 | 9/2004 | Ano | |
| 6,791,533 B2 | 9/2004 | Su | |
| 6,795,057 B2 | 9/2004 | Gordon | |
| D497,618 S | 10/2004 | Andre et al. | |
| 6,803,906 B1 | 10/2004 | Morrison et al. | 345/173 |
| 6,810,271 B1 | 10/2004 | Wood et al. | |
| 6,822,640 B2 | 11/2004 | Derocher | |
| 6,834,975 B2 | 12/2004 | Chu-Chia et al. | |
| 6,842,672 B1 | 1/2005 | Straub et al. | 701/3 |
| 6,844,872 B1 | 1/2005 | Farag et al. | |
| 6,855,899 B2 | 2/2005 | Sotome | |
| 6,856,259 B1 | 2/2005 | Sharp | 341/5 |
| 6,865,718 B2 | 3/2005 | Montalcini | |
| 6,886,842 B2 | 5/2005 | Vey et al. | |
| 6,888,536 B2 | 5/2005 | Westerman et al. | 345/173 |
| 6,894,916 B2 | 5/2005 | Reohr et al. | |
| 6,900,795 B1 | 5/2005 | Knight, III et al. | 345/173 |
| D506,476 S | 6/2005 | Andre et al. | |
| 6,922,189 B2 | 7/2005 | Fujiyoshi | |
| 6,927,761 B2 | 8/2005 | Badaye et al. | 345/173 |
| 6,930,494 B2 | 8/2005 | Tesdahl et al. | |
| 6,942,571 B1 | 9/2005 | McAllister et al. | 463/20 |
| 6,958,614 B2 | 10/2005 | Morimoto | |
| 6,965,375 B1 | 11/2005 | Gettemy et al. | 345/173 |
| 6,972,401 B2 | 12/2005 | Akitt et al. | 250/221 |
| 6,977,666 B1 | 12/2005 | Hedrick | 345/690 |
| 6,977,808 B2 | 12/2005 | Lam et al. | |
| 6,978,127 B1 | 12/2005 | Bulthuis et al. | |
| 6,985,137 B2 | 1/2006 | Kaikuranta | |
| 6,985,801 B1 | 1/2006 | Straub et al. | 701/3 |
| 6,992,659 B2 | 1/2006 | Gettemy | 345/173 |
| 7,006,077 B1 | 2/2006 | Uusimäki | |
| 7,019,225 B2 | 3/2006 | Matsumoto et al. | |
| 7,031,228 B2 | 4/2006 | Born et al. | 368/69 |
| 7,046,230 B2 | 5/2006 | Zadesky et al. | |
| 7,050,292 B2 | 5/2006 | Shimura et al. | |
| 7,069,044 B2 | 6/2006 | Okada et al. | |
| 7,078,633 B2 | 7/2006 | Ihalainen | |
| 7,084,856 B2 | 8/2006 | Huppi | |
| 7,113,196 B2 | 9/2006 | Kerr | |
| 7,117,136 B1 | 10/2006 | Rosedale | |
| 7,119,792 B1 | 10/2006 | Andre et al. | |
| 7,215,319 B2 | 5/2007 | Kamijo et al. | |
| 7,233,318 B1 | 6/2007 | Farag et al. | |
| 7,236,154 B1 | 6/2007 | Kerr et al. | |
| 7,236,159 B1 | 6/2007 | Siversson | |
| 7,253,643 B1 | 8/2007 | Seguine | |
| 7,279,647 B2 | 10/2007 | Philipp | |
| 7,288,732 B2 | 10/2007 | Hashida | |
| 7,297,883 B2 | 11/2007 | Rochon et al. | |
| 7,310,089 B2 | 12/2007 | Baker et al. | |
| 7,312,785 B2 | 12/2007 | Tsuk et al. | |
| 7,321,103 B2 | 1/2008 | Nakanishi et al. | |
| 7,333,092 B2 | 2/2008 | Zadesky et al. | |
| 7,348,898 B2 | 3/2008 | Ono | |
| 7,382,139 B2 | 6/2008 | Mackey | |
| 7,394,038 B2 | 7/2008 | Chang | |
| 7,395,081 B2 | 7/2008 | Kristensen et al. | |
| 7,397,467 B2 | 7/2008 | Park et al. | |
| 7,439,963 B2 | 10/2008 | Geaghan et al. | |
| 7,466,307 B2 | 12/2008 | Trent et al. | |
| 7,486,323 B2 | 2/2009 | Lee et al. | |
| 7,502,016 B2 | 3/2009 | Trent, Jr. et al. | |
| 7,503,193 B2 | 3/2009 | Schoene et al. | |
| 7,593,782 B2 | 9/2009 | Jobs et al. | |
| 7,645,955 B2 | 1/2010 | Huang et al. | |
| 7,671,837 B2 | 3/2010 | Forsblad et al. | |
| 7,708,051 B2 | 5/2010 | Katsumi et al. | |
| 7,772,507 B2 | 8/2010 | Orr et al. | |
| 2001/0011991 A1 | 8/2001 | Wang et al. | |
| 2001/0011993 A1 | 8/2001 | Saarinen | |
| 2001/0033270 A1 | 10/2001 | Osawa et al. | |

| | | | | | | |
|---|---|---|---|---|---|---|
| 2001/0043545 A1 | 11/2001 | Aratani | | 2005/0156881 A1 | 7/2005 | Trent et al. |
| 2001/0050673 A1 | 12/2001 | Davenport | | 2005/0162402 A1 | 7/2005 | Watanachote |
| 2001/0051046 A1 | 12/2001 | Watanabe et al. | | 2005/0204309 A1 | 9/2005 | Szeto |
| 2002/0011993 A1 | 1/2002 | Lui et al. | | 2005/0237308 A1 | 10/2005 | Autio et al. |
| 2002/0027547 A1 | 3/2002 | Kamijo | | 2006/0022955 A1 | 2/2006 | Kennedy ............... 345/173 |
| 2002/0030665 A1 | 3/2002 | Ano | | 2006/0022956 A1 | 2/2006 | Lengeling et al. ......... 345/173 |
| 2002/0033848 A1 | 3/2002 | Sciammarella et al. | | 2006/0026521 A1 | 2/2006 | Hotelling et al. ......... 715/702 |
| 2002/0039493 A1 | 4/2002 | Tanaka | | 2006/0026535 A1 | 2/2006 | Hotelling et al. ......... 715/863 |
| 2002/0045960 A1 | 4/2002 | Phillips et al. | | 2006/0026536 A1 | 2/2006 | Hotelling et al. ......... 715/863 |
| 2002/0071550 A1 | 6/2002 | Pletikosa | | 2006/0032680 A1 | 2/2006 | Elias et al. ............. 178/18.06 |
| 2002/0089545 A1 | 7/2002 | Levi Montalcini | | 2006/0033724 A1 | 2/2006 | Chaudhri et al. .......... 345/173 |
| 2002/0103796 A1 | 8/2002 | Hartley | | 2006/0038791 A1 | 2/2006 | Mackey |
| 2002/0118131 A1 | 8/2002 | Yates et al. | | 2006/0053387 A1 | 3/2006 | Ording ..................... 715/773 |
| 2002/0118169 A1 | 8/2002 | Hinckley et al. | | 2006/0066582 A1 | 3/2006 | Lyon et al. ............... 345/173 |
| 2002/0118848 A1 | 8/2002 | Karpenstein ............. 381/119 | | 2006/0085757 A1 | 4/2006 | Andre et al. .............. 715/771 |
| 2002/0145594 A1 | 10/2002 | Derocher | | 2006/0095848 A1 | 5/2006 | Naik |
| 2002/0154090 A1 | 10/2002 | Lin | | 2006/0097991 A1 | 5/2006 | Hotelling et al. .......... 345/173 |
| 2002/0158844 A1 | 10/2002 | McLoone et al. | | 2006/0131156 A1 | 6/2006 | Voelckers |
| 2002/0164156 A1 | 11/2002 | Bilbrey | | 2006/0143574 A1 | 6/2006 | Ito et al. |
| 2002/0168947 A1 | 11/2002 | Lemley | | 2006/0174568 A1 | 8/2006 | Kinoshita et al. |
| 2002/0180701 A1 | 12/2002 | Hayama et al. | | 2006/0181517 A1 | 8/2006 | Zadesky et al. |
| 2002/0196239 A1 | 12/2002 | Lee | | 2006/0197750 A1 | 9/2006 | Kerr et al. |
| 2003/0002246 A1 | 1/2003 | Kerr | | 2006/0197753 A1 | 9/2006 | Hotelling ................... 345/173 |
| 2003/0006974 A1 | 1/2003 | Clough et al. ............ 345/179 | | 2006/0232557 A1 | 10/2006 | Fallot-Burghardt |
| 2003/0025679 A1 | 2/2003 | Taylor et al. | | 2006/0236262 A1 | 10/2006 | Bathiche et al. |
| 2003/0028346 A1 | 2/2003 | Sinclair et al. | | 2006/0250377 A1 | 11/2006 | Zadesky et al. |
| 2003/0043121 A1 | 3/2003 | Chen | | 2006/0274042 A1 | 12/2006 | Krah et al. |
| 2003/0043174 A1 | 3/2003 | Hinckley et al. | | 2006/0274905 A1 | 12/2006 | Lindahl et al. |
| 2003/0050092 A1 | 3/2003 | Yun | | 2006/0279896 A1 | 12/2006 | Bruwer |
| 2003/0076301 A1 | 4/2003 | Tsuk et al. ................ 345/159 | | 2006/0284836 A1 | 12/2006 | Philipp |
| 2003/0076303 A1 | 4/2003 | Huppi ...................... 345/163 | | 2007/0013671 A1 | 1/2007 | Zadesky et al. |
| 2003/0076306 A1 | 4/2003 | Zadesky et al. ........... 345/173 | | 2007/0018970 A1 | 1/2007 | Tabasso et al. |
| 2003/0091377 A1 | 5/2003 | Hsu et al. | | 2007/0052044 A1 | 3/2007 | Forsblad et al. |
| 2003/0095095 A1 | 5/2003 | Pihlaja ..................... 345/156 | | 2007/0052691 A1 | 3/2007 | Zadesky et al. |
| 2003/0095096 A1 | 5/2003 | Robbin et al. ............. 345/156 | | 2007/0080936 A1 | 4/2007 | Tsuk et al. |
| 2003/0098851 A1 | 5/2003 | Brink | | 2007/0080938 A1 | 4/2007 | Robbin et al. |
| 2003/0098858 A1 | 5/2003 | Perski et al. .............. 345/173 | | 2007/0080952 A1 | 4/2007 | Lynch et al. |
| 2003/0103043 A1* | 6/2003 | Mulligan et al. .......... 345/174 | | 2007/0083822 A1 | 4/2007 | Robbin et al. |
| 2003/0135292 A1 | 7/2003 | Husgafvel et al. | | 2007/0085841 A1 | 4/2007 | Tsuk et al. |
| 2003/0142081 A1 | 7/2003 | Iizuka et al. | | 2007/0097086 A1 | 5/2007 | Battles et al. |
| 2003/0184517 A1 | 10/2003 | Senzui et al. | | 2007/0120834 A1 | 5/2007 | Boillot |
| 2003/0197740 A1 | 10/2003 | Reponen | | 2007/0126696 A1 | 6/2007 | Boillot |
| 2003/0206202 A1 | 11/2003 | Moriya | | 2007/0152975 A1 | 7/2007 | Ogihara |
| 2003/0210537 A1 | 11/2003 | Engelmann | | 2007/0152977 A1 | 7/2007 | Ng et al. |
| 2003/0224831 A1 | 12/2003 | Engstrom et al. | | 2007/0152983 A1 | 7/2007 | McKillop et al. |
| 2003/0234768 A1 | 12/2003 | Rekimoto et al. ......... 345/169 | | 2007/0155434 A1 | 7/2007 | Jobs et al. |
| 2004/0027341 A1 | 2/2004 | Derocher | | 2007/0157089 A1 | 7/2007 | Van Os et al. |
| 2004/0074756 A1 | 4/2004 | Kawakami et al. | | 2007/0242057 A1 | 10/2007 | Zadesky et al. |
| 2004/0080682 A1 | 4/2004 | Dalton | | 2007/0247421 A1 | 10/2007 | Orsley et al. |
| 2004/0109357 A1 | 6/2004 | Cernea et al. | | 2007/0247443 A1 | 10/2007 | Philipp |
| 2004/0150619 A1 | 8/2004 | Baudisch et al. | | 2007/0273671 A1 | 11/2007 | Zadesky et al. |
| 2004/0156192 A1 | 8/2004 | Kerr et al. | | 2007/0276525 A1 | 11/2007 | Zadesky et al. |
| 2004/0178997 A1 | 9/2004 | Gillespie et al. | | 2007/0279394 A1 | 12/2007 | Lampell |
| 2004/0215986 A1 | 10/2004 | Shakkarwar | | 2007/0285404 A1 | 12/2007 | Rimon et al. |
| 2004/0224638 A1 | 11/2004 | Fadell et al. | | 2007/0290990 A1 | 12/2007 | Robbin et al. |
| 2004/0239622 A1 | 12/2004 | Proctor et al. | | 2007/0291016 A1 | 12/2007 | Philipp |
| 2004/0252109 A1 | 12/2004 | Trent, Jr. et al. | | 2007/0296709 A1 | 12/2007 | GuangHai |
| 2004/0252867 A1 | 12/2004 | Lan et al. | | 2008/0006453 A1 | 1/2008 | Hotelling et al. |
| 2004/0253989 A1 | 12/2004 | Tupler et al. | | 2008/0006454 A1 | 1/2008 | Hotelling |
| 2004/0263388 A1 | 12/2004 | Krumm et al. | | 2008/0007533 A1 | 1/2008 | Hotelling et al. |
| 2004/0263484 A1 | 12/2004 | Mantysalo et al. ........ 345/173 | | 2008/0007539 A1 | 1/2008 | Hotelling et al. |
| 2004/0267874 A1 | 12/2004 | Westberg et al. | | 2008/0012837 A1 | 1/2008 | Marriott et al. |
| 2005/0012644 A1 | 1/2005 | Hurst et al. | | 2008/0018615 A1 | 1/2008 | Zadesky et al. |
| 2005/0012723 A1 | 1/2005 | Pallakoff .................. 345/173 | | 2008/0018616 A1 | 1/2008 | Lampell et al. |
| 2005/0017957 A1 | 1/2005 | Yi | | 2008/0018617 A1 | 1/2008 | Ng et al. |
| 2005/0024341 A1 | 2/2005 | Gillespie et al. | | 2008/0036473 A1 | 2/2008 | Jansson |
| 2005/0030048 A1 | 2/2005 | Bolender | | 2008/0036734 A1 | 2/2008 | Forsblad et al. |
| 2005/0052425 A1 | 3/2005 | Zadesky et al. ........... 345/173 | | 2008/0060925 A1 | 3/2008 | Weber et al. |
| 2005/0052426 A1 | 3/2005 | Hagermoser et al. | | 2008/0069412 A1 | 3/2008 | Champagne et al. |
| 2005/0052429 A1 | 3/2005 | Philipp | | 2008/0079699 A1 | 4/2008 | Mackey |
| 2005/0068304 A1 | 3/2005 | Lewis et al. | | 2008/0087476 A1 | 4/2008 | Prest |
| 2005/0083299 A1 | 4/2005 | Nagasaka | | 2008/0088582 A1 | 4/2008 | Prest |
| 2005/0083307 A1 | 4/2005 | Aufderheide | | 2008/0088596 A1 | 4/2008 | Prest |
| 2005/0090288 A1 | 4/2005 | Stohr et al. | | 2008/0088597 A1 | 4/2008 | Prest |
| 2005/0104867 A1 | 5/2005 | Westerman et al. ....... 345/173 | | 2008/0088600 A1 | 4/2008 | Prest |
| 2005/0110768 A1 | 5/2005 | Marriott et al. | | 2008/0094352 A1 | 4/2008 | Tsuk et al. |
| 2005/0139460 A1 | 6/2005 | Hosaka | | 2008/0098330 A1 | 4/2008 | Tsuk et al. |
| 2005/0140657 A1 | 6/2005 | Park et al. | | 2008/0110739 A1 | 5/2008 | Peng et al. |
| 2005/0143124 A1 | 6/2005 | Kennedy et al. | | 2008/0111795 A1 | 5/2008 | Bollinger |

| | | | | | | |
|---|---|---|---|---|---|---|
| 2008/0143681 | A1 | 6/2008 | XiaoPing | GB | 2391060 | 1/2004 |
| 2008/0165158 | A1 | 7/2008 | Hotelling et al. | GB | 2 402 105 | 12/2004 |
| 2008/0196945 | A1 | 8/2008 | Konstas | JP | 57-95722 | 6/1982 |
| 2008/0209442 | A1 | 8/2008 | Setlur et al. | JP | 57-97626 | 6/1982 |
| 2008/0264767 | A1 | 10/2008 | Chen et al. | JP | 61-117619 | 6/1986 |
| 2008/0280651 | A1 | 11/2008 | Duarte | JP | 61-124009 | 6/1986 |
| 2008/0284742 | A1 | 11/2008 | Prest | JP | 63-20411 | 1/1988 |
| 2008/0293274 | A1 | 11/2008 | Milan | JP | 63-106826 | 5/1988 |
| 2009/0021267 | A1 | 1/2009 | Golovchenko et al. | JP | 63-181022 | 7/1988 |
| 2009/0026558 | A1 | 1/2009 | Bauer et al. | JP | 63-298518 | 12/1988 |
| 2009/0033635 | A1 | 2/2009 | Wai | JP | 03-57617 | 6/1991 |
| 2009/0036176 | A1 | 2/2009 | Ure | JP | 3-192418 | 8/1991 |
| 2009/0058687 | A1 | 3/2009 | Rothkopf et al. | JP | 04-32920 | 2/1992 |
| 2009/0058801 | A1 | 3/2009 | Bull | JP | 4-205408 | 7/1992 |
| 2009/0058802 | A1 | 3/2009 | Orsley et al. | JP | 5-041135 | 2/1993 |
| 2009/0073130 | A1 | 3/2009 | Weber et al. | JP | 5-080938 | 4/1993 |
| 2009/0078551 | A1 | 3/2009 | Kang | JP | 5-101741 | 4/1993 |
| 2009/0109181 | A1 | 4/2009 | Hui et al. | JP | 5-36623 | 5/1993 |
| 2009/0141046 | A1 | 6/2009 | Rathnam et al. | JP | 5-189110 | 7/1993 |
| 2009/0160771 | A1 | 6/2009 | Hinckley et al. | JP | 5-205565 | 8/1993 |
| 2009/0179854 | A1 | 7/2009 | Weber et al. | JP | 5-211021 | 8/1993 |
| 2009/0197059 | A1 | 8/2009 | Weber et al. | JP | 5-217464 | 8/1993 |
| 2009/0229892 | A1 | 9/2009 | Fisher et al. | JP | 5-233141 | 9/1993 |
| 2009/0273573 | A1 | 11/2009 | Hotelling | JP | 5-262276 | 10/1993 |
| 2010/0058251 | A1 | 3/2010 | Rottler et al. | JP | 5-265656 | 10/1993 |
| 2010/0060568 | A1 | 3/2010 | Fisher et al. | JP | 5-274956 | 10/1993 |
| 2010/0073319 | A1 | 3/2010 | Lyon et al. | JP | 5-289811 | 11/1993 |
| 2010/0149127 | A1 | 6/2010 | Fisher et al. | JP | 5-298955 | 11/1993 |
| | | | | JP | 5-325723 | 12/1993 |
| FOREIGN PATENT DOCUMENTS | | | | JP | 6-20570 | 1/1994 |
| | | | | JP | 6-084428 | 3/1994 |
| CN | | 1139235 | 1/1997 | JP | 6-089636 | 3/1994 |
| CN | | 1455615 | 11/2003 | JP | 6-96639 | 4/1994 |
| CN | | 1499356 | 5/2004 | JP | 6-111695 | 4/1994 |
| CN | | 1659506 | 8/2005 | JP | 6-139879 | 5/1994 |
| DE | | 3615742 | 11/1987 | JP | 6-187078 | 7/1994 |
| DE | | 19722636 | 12/1998 | JP | 6-208433 | 7/1994 |
| DE | | 10022537 | 11/2000 | JP | 6-267382 | 9/1994 |
| DE | | 20019074 U1 | 2/2001 | JP | 6-283993 | 10/1994 |
| DE | | 102 51 296 | 5/2004 | JP | 6-333459 | 12/1994 |
| DE | | 10 2004 043 663 | 4/2006 | JP | 7-107574 | 4/1995 |
| EP | | 0178157 | 4/1986 | JP | 7-41882 | 7/1995 |
| EP | | 0419145 A1 | 3/1991 | JP | 7-201249 | 8/1995 |
| EP | | 0 498 540 | 8/1992 | JP | 7-201256 | 8/1995 |
| EP | | 0 521 683 | 1/1993 | JP | 7-253838 | 10/1995 |
| EP | | 0 288 692 | 7/1993 | JP | 7-261899 | 10/1995 |
| EP | | 0 664 504 | 7/1995 | JP | 7-261922 | 10/1995 |
| EP | | 0 674 288 | 9/1995 | JP | 7-296670 | 11/1995 |
| EP | | 0 464 908 | 9/1996 | JP | 7-319001 | 12/1995 |
| EP | | 0 731 407 | 9/1996 | JP | 8-016292 | 1/1996 |
| EP | | 0 551 778 B1 | 1/1997 | JP | 8-115158 | 5/1996 |
| EP | | 0 880 091 A2 | 11/1998 | JP | 8-203387 | 8/1996 |
| EP | | 1 026 713 | 8/2000 | JP | 8-293226 | 11/1996 |
| EP | | 1 081 922 A2 | 3/2001 | JP | 8-298045 | 11/1996 |
| EP | | 1 098 241 A2 | 5/2001 | JP | 8-299541 | 11/1996 |
| EP | | 1 133 057 | 9/2001 | JP | 8-316664 | 11/1996 |
| EP | | 1 162 826 A2 | 12/2001 | JP | 9-044289 | 2/1997 |
| EP | | 1 014 295 | 1/2002 | JP | 9-069023 | 3/1997 |
| EP | | 1 168 396 | 1/2002 | JP | 9-128148 | 5/1997 |
| EP | | 1 205 836 A2 | 5/2002 | JP | 9-134248 | 5/1997 |
| EP | | 1 244 053 | 9/2002 | JP | 9-218747 | 8/1997 |
| EP | | 1 251 455 A2 | 10/2002 | JP | 9-230993 | 9/1997 |
| EP | | 1263193 | 12/2002 | JP | 9-231858 | 9/1997 |
| EP | | 1347481 | 9/2003 | JP | 9-233161 | 9/1997 |
| EP | | 1376326 | 1/2004 | JP | 9-251347 | 9/1997 |
| EP | | 1 467 392 | 10/2004 | JP | 9-258895 | 10/1997 |
| EP | | 1 482 401 | 12/2004 | JP | 9-288926 | 11/1997 |
| EP | | 1 496 467 | 1/2005 | JP | 9-512979 | 12/1997 |
| EP | | 1 517 228 | 3/2005 | JP | 10-63467 | 3/1998 |
| EP | | 1 542 437 A2 | 6/2005 | JP | 10-74127 | 3/1998 |
| EP | | 1 589 407 | 10/2005 | JP | 10-074429 | 3/1998 |
| EP | | 1 784 058 A2 | 5/2007 | JP | 10-198507 | 7/1998 |
| EP | | 1 841 188 | 10/2007 | JP | 10-227878 | 8/1998 |
| EP | | 1850218 | 10/2007 | JP | 10-240693 | 9/1998 |
| EP | | 1 876 711 | 1/2008 | JP | 10-320322 | 12/1998 |
| FR | | 2 686 440 | 7/1993 | JP | 10-326149 | 12/1998 |
| GB | | 2015167 | 9/1979 | JP | 11-24834 | 1/1999 |
| GB | | 2072389 | 9/1981 | JP | 11-184607 | 7/1999 |
| GB | | 2315186 | 1/1998 | JP | 11-194863 | 7/1999 |
| GB | | 2333215 | 7/1999 | | | |

| | | |
|---|---|---|
| JP | 11-194872 | 7/1999 |
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | 11-212725 | 8/1999 |
| JP | 11-272378 | 10/1999 |
| JP | 11-338628 | 12/1999 |
| JP | 2000-200147 | 7/2000 |
| JP | 2000-215549 | 8/2000 |
| JP | 2000-267786 | 9/2000 |
| JP | 2000-267797 | 9/2000 |
| JP | 2000-353045 | 12/2000 |
| JP | 2001-11769 | 1/2001 |
| JP | 2001-22508 | 1/2001 |
| JP | 2001-184158 | 7/2001 |
| JP | 3085481 | 2/2002 |
| JP | 2002-215311 | 8/2002 |
| JP | 2003-150303 | 5/2003 |
| JP | 2003-517674 | 5/2003 |
| JP | 2003-280799 | 10/2003 |
| JP | 2003-280807 | 10/2003 |
| JP | 2004-362097 | 12/2004 |
| JP | 2005-251218 | 9/2005 |
| JP | 2005-285140 | 10/2005 |
| JP | 2005-293606 | 10/2005 |
| JP | 2006-004453 | 1/2006 |
| JP | 2006-178962 | 7/2006 |
| JP | 3852854 | 12/2006 |
| JP | 2007-123473 | 5/2007 |
| KR | 1998-71394 | 10/1998 |
| KR | 1999-50198 | 7/1999 |
| KR | 2000-0008579 | 2/2000 |
| KR | 2001-0052016 | 6/2001 |
| KR | 2001-108361 | 12/2001 |
| KR | 2002-65059 | 8/2002 |
| KR | 10-2006-0021678 | 3/2006 |
| TW | 431607 | 4/2001 |
| TW | 00470193 | 12/2001 |
| TW | 547716 | 8/2003 |
| TW | I220491 | 8/2004 |
| WO | WO-94/17494 | 8/1994 |
| WO | WO-95/00897 A1 | 1/1995 |
| WO | WO-96/27968 | 9/1996 |
| WO | 97/18547 | 5/1997 |
| WO | 97/23738 | 7/1997 |
| WO | 98/14863 | 4/1998 |
| WO | WO-99/49443 | 9/1999 |
| WO | WO-00/79772 | 12/2000 |
| WO | WO-01/02949 | 1/2001 |
| WO | WO-01/44912 | 6/2001 |
| WO | WO-02/08881 | 1/2002 |
| WO | WO-03/025960 | 3/2003 |
| WO | WO-03/044645 | 5/2003 |
| WO | WO 03/044956 | 5/2003 |
| WO | 03/088176 | 10/2003 |
| WO | WO 03/090008 | 10/2003 |
| WO | WO-2004/001573 | 12/2003 |
| WO | WO 2004/040606 | 5/2004 |
| WO | WO-2004/091956 | 10/2004 |
| WO | WO-2005/055620 | 6/2005 |
| WO | WO 2005/076117 | 8/2005 |
| WO | WO-2005/114369 | 12/2005 |
| WO | WO 2005/124526 | 12/2005 |
| WO | WO-2006/020305 | 2/2006 |
| WO | 2006/023569 | 3/2006 |
| WO | WO-2006/021211 A2 | 3/2006 |
| WO | WO 2006/037545 | 4/2006 |
| WO | WO 2006/104745 | 10/2006 |
| WO | WO-2006/135127 | 12/2006 |
| WO | WO 2007/025858 | 3/2007 |
| WO | WO-2007/078477 | 7/2007 |
| WO | WO-2007/084467 | 7/2007 |
| WO | WO-2007/089766 | 8/2007 |
| WO | WO-2008/007372 | 1/2008 |
| WO | WO-2008/045414 | 4/2008 |
| WO | WO-2008/045833 | 4/2008 |

OTHER PUBLICATIONS

Japanese Office Action mailed Jan. 5, 2009, directed counterpart JP Application No. 2007-525885; 1 page.
Robbin, U.S. Appl. No. 60/346,237 entitled, "Method and System for List Scrolling," filed Oct. 22, 2001; 12 pages.
Zadesky et al., U.S. Appl. No. 60/359,551 entitled "Touchpad for Handheld Device," filed Feb. 25, 2002; 34 pages.
Grignon et al., U.S. Appl. No. 60/755,656, filed Dec. 30, 2005, entitled "Touch Pad with Feedback"; 109 pages.
Elias et al., U.S. Appl. No. 60/522,107, filed Aug. 16, 2004, entitled, "A Method for Increasing the Spatial Resolution of Touch Sensitive Devices"; 15 pages.
Hotelling, U.S. Appl. No. 60/658,777 titled "Multi-Functional Handheld Device," filed Mar. 4, 2005; 68 pages.
Zadesky et al., U.S. Appl. No. 60/714,609 entitled "Scrolling Input Arrangements Using Capacitive Sensors on a Flexible Membrane," filed Sep. 6, 2005; 17 pages.
Lampell et al., U.S. Appl. No. 60/810,423, filed Jun. 2, 2006, entitled "Techniques for Interactive Input to Portable Electronic Devices"; 53 pages.
Prest et al., U.S. Appl. No. 60/850,662, filed Oct. 11, 2006, entitled, "Capacitive Scroll Wheel"; 21 pages.
Bollinger, U.S. Appl. No. 60/858,404, filed Nov. 13, 2006, entitled "Method of Capacitively Sensing Finger Position"; 13 pages.
Rothkopf, U.S. Appl. No. 60/935,854 titled "Compact Media Players," filed Sep. 4, 2007; 36 pages.
Rathnam et al., U.S. Appl. No. 60/992,056, filed Dec. 3, 2007, entitled, "Scroll Wheel Circuit Arrangements and Methods of Use Thereof"; 42 pages.
Rathnam et al., U.S. Appl. No. 61/017,436, filed Dec. 28, 2007, entitled, "Multi-Touch Scroll Wheel Circuit Arrangements and Processing Methods"; 58 pages.
Weber et al., U.S. Appl. No. 61/020,531, filed Jan. 11, 2008 entitled "Modifiable Clickwheel Text"; 11 pages.
Weber et al., U.S. Appl. No. 61/025,531, filed Feb. 1, 2008 entitled "Co-Extruded Materials and Methods"; 11 pages.
Fisher et al., U.S. Appl. No. 61/036,804, filed Mar. 14, 2008 entitled "Switchable Sensor Configurations"; 46 pages.
EP Communication Pursuant to Article 94(3) EPC dated Sep. 2, 2009, directed to Application No. 05786737.6; 5 pages.
Tsuk et al., U.S. Office Action mailed Aug. 7, 2009, directed to U.S. Appl. No. 11/610,181; 20 pages.
Robbin et al., U.S. Office Action mailed Aug. 10, 2009, directed to U.S. Appl. No. 11/610,376; 11 pages.
Robbin et al., U.S. Office Action mailed Aug. 12, 2009, directed to U.S. Appl. No. 11/610,384; 20 pages.
Hotelling, U.S. Office Action mailed Sep. 1, 2009, directed to U.S. Appl. No. 11/482,286; 14 pages.
Lampell, U.S. Office Action mailed Sep. 15, 2009, directed to U.S. Appl. No. 11/530,807; 15 pages.
Boling, Douglas (1993) "Programming Microsoft Windows CE.NET," p. 109.
Robbin et al., U.S. Appl. No. 60/387,692 entitled "Method and Apparatus for Use of Rotational User Inputs," filed Jun. 10, 2002.
Robbin et al., U.S. Appl. No. 60/399,806 entitled "Graphical User Interface and Methods of Use Thereof in a Multimedia Player," filed Jul. 30, 2002.
Tsuk et al., U.S. Office Action mailed Oct. 13, 2006, directed to U.S. Appl. No. 10/256,716; 16 pages.
Tsuk et al., U.S. Office Action mailed Aug. 3, 2006, directed to U.S. Appl. No. 10/256,716; 15 pages.
Tsuk et al., U.S. Office Action mailed Jan. 10, 2006, directed to U.S. Appl. No. 10/256,716; 12 pages.
Tsuk et al., U.S. Office Action mailed Jun. 24, 2005, directed to U.S. Appl. No. 10/256,716; 12 pages.
Tsuk et al., U.S. Office Action mailed Sep. 30, 2004, directed to U.S. Appl. No. 10/256,716; 11 pages.
Tsuk et al., U.S. Office Action mailed Jul. 7, 2009, directed to U.S. Appl. No. 11/610,190; 24 pages.
Robbin et al., U.S. Office Action mailed Jan. 18, 2007, directed to U.S. Appl. No. 10/259,159; 18 pages.
Robbin et al., U.S. office Action mailed Oct. 13, 2006, directed to U.S. Appl. No. 10/259,159; 18 pages.

Robbin et al., U.S. Office Action mailed Aug. 3, 2006, directed to U.S. Appl. No. 10/259,159; 15 pages.
Robbin et al., U.S. Office Action mailed Jan. 11, 2006, directed to U.S. Appl. No. 10/259,159; 15 pages.
Robbin et al., U.S. Office Action mailed Jun. 16, 2005, directed to U.S. Appl. No. 10/259,159; 16 pages.
Robbin et al., U.S. Office Action mailed Sep. 30, 2004, directed to U.S. Appl. No. 10/259,159; 14 pages.
Zadesky et al., U.S. Office Action mailed Jul. 9, 2008, directed to U.S. Appl. No. 10/643,256; 12 pages.
Zadesky et al., U.S. Office Action mailed Dec. 12, 2007, directed to U.S. Appl. No. 10/643,256; 12 pages.
Zadesky et al., U.S. Office Action mailed Jul. 13, 2007, directed to U.S. Appl. No. 10/643,256; 13 pages.
Zadesky et al., U.S. Office Action mailed Mar. 23, 2007, directed to U.S. Appl. No. 10/643,256; 11 pages.
Zadesky et al., U.S. Office Action mailed Oct. 27, 2006, directed to U.S. Appl. No. 10/643,256; 14 pages.
Forsblad et al., U.S. Office Action mailed Jun. 25, 2009, directed to U.S. Appl. No. 11/355,022; 18 pages.
Forsblad et al., U.S. Office Action mailed Jan. 26, 2009, directed to U.S. Appl. No. 11/355,022; 15 pages.
Hotelling et al., U.S. Office Action mailed Jan. 27, 2009, directed to U.S. Appl. No. 11/882,421; 15 pages.
Zadesky et al., U.S. Office Action mailed Aug. 6, 2009, directed to U.S. Appl. No. 11/057,050; 30 pages.
Zadesky et al., U.S. Office Action mailed Feb. 20, 2009, directed to U.S. Appl. No. 11/057,050; 25 pages.
Zadesky et al., U.S. Office Action mailed Dec. 24, 2008, directed to U.S. Appl. No. 11/057,050; 25 pages.
Zadesky et al., U.S. Office Action mailed Nov. 26, 2008, directed to U.S. Appl. No. 11/057,050; 25 pages.
Zadesky et al, U.S. Office Action mailed Aug. 19, 2008, directed to U.S. Appl. No. 11/057,050; 23 pages.
Zadesky et al., U.S. Office Action mailed Nov. 20, 2007, directed to U.S. Appl. No. 11/057,050; 33 pages.
Zadesky et al., U.S. Office Action mailed Mar. 5, 2009, directed to U.S. Appl. No. 11/477,469; 12 pages.
Zadesky et al., U.S. Office Action mailed Jul. 30, 2004, directed to U.S. Appl. No. 10/188,182; 7 pages.
Zadesky et al., U.S. Office Action mailed Sep. 21, 2005, directed to U.S. Appl. No. 10/188,182; 10 pages.
Zadesky et al., U.S. Office Action mailed Mar. 4, 2004, directed to U.S. Appl. No. 10/188,182; 8 pages.
Zadesky et al., U.S. Office Action mailed Oct. 4, 2007, directed to U.S. Appl. No. 11/386,238; 12 pages.
Zadesky et al.., U.S. Office Action mailed Oct. 4, 2007, directed to U.S. Appl. No. 11/806,957; 14 pages.
Marriott et al., U.S. Office Action mailed Jan. 30, 2008, directed to U.S. Appl. No. 10/722,948; 17 pages.
Marriott et al., U.S. Office Action mailed Jul. 13, 2007, directed to U.S. Appl. No. 10/722,948; 15 pages.
Marriott et al., U.S. Office Action mailed Dec. 12, 2006, directed to U.S. Appl. No. 10/722,948; 14 pages.
Marriott et al., U.S. Office Action mailed Jun. 2, 2006, directed to U.S. Appl. No. 10/722,948; 12 pages.
Hotelling et al., U.S. Office Action mailed Jul. 24, 2009, directed to U.S. Appl. No. 11/483,008; 17 pages.
Hotelling et al., U.S. Office Action mailed Jul. 27, 2009, directed to U.S. Appl. No. 11/882,420; 17 pages.
JP Office Action mailed Jan. 4, 2010, directed to counterpart JP Application No. 2007-525885; 2 pages.
Interlink Electronics, VersaPad: Integration Guide, © 1998 (VersaPad), pp. 1-35.
Ng et al., U.S. Office Action mailed Jan. 14, 2010, directed to U.S. Appl. No. 11/394,493; 20 pages.
Ng et al., U.S. Office Action mailed Jan. 15, 2010, directed to U.S. Appl. No. 11/882,423; 22 pages.
Tsuk et al., U.S. Office Action mailed Dec. 31, 2009, directed to U.S. Appl. No. 11/610,190; 25 pages.
Zadesky et al., U.S. Office Action mailed Feb. 4, 2010, directed to U.S. Appl. No. 11/477,469; 14 pages.
Hotelling, U.S. Office Action mailed Jan. 25, 2010, directed to U.S. Appl. No. 11/482,286; 17 pages.
Lynch et al., U.S. Office Action mailed Oct. 5, 2009, directed to U.S. Application No. 11/499,360; 7 pages.
Lynch et al., U.S. Office Action mailed Jan. 27, 2010, directed to U.S. Application No. 11/499,360; 8 pages.
Letter re: Bang & Olufsen a/s by David Safran, Nixon Peabody, LLP, May 21, 2004, with BeoCom 6000 Sales Training Brochure, 7 pages.
Kobayashi et al. (1994) "Development of the Touch Switches with the Click Response," Koukuu Denshi Gihou No. 17, pp. 44-48 (published by the Japan Aviation Electronics Industry, Ltd.).
Photographs of Innovation 2000 Best of Show Award Presented at the 2000 Int'l CES Innovations Design & Engineering Showcase, Jan. 6, 2000, 1 page.
SanDisk Sansa Connect User Guide, 2007; 29 pages.
KIPO's Notice of Preliminary Rejection dated Apr. 1, 2010, directed to counterpart application No. 10-2009-7017577; 6 pages.
Tsuk et al., U.S. Office Action mailed Apr. 28, 2010, directed to U.S. Appl. No. 11/610,190; 29 pages.
Zadesky et al., U.S. Office Action mailed Mar. 30, 2010, directed to U.S. Appl. No. 11/592,679; 13 pages.
Hotelling et al., U.S. Office Action mailed Mar. 30, 2010, directed to U.S. Appl. No. 11/483,008; 20 pages.
Ng et al., U.S. Office Action mailed Jun. 22, 2010, directed to U.S. Appl. No. 11/394,493; 14 pages.
Lampell, U.S. Office Action mailed Jun. 4, 2010, directed to U.S. Appl. No. 11/530,807; 15 pages.
Prest et al., U.S. Office Action mailed Jun. 22, 2010, directed to U.S. Appl. No. 11/878,132; 32 pages.
Prest et al., U.S. Office Action mailed Jun. 22, 2010, directed to U.S. Appl. No. 11/882,882; 32 pages.
Prest et al., U.S. Office Action mailed Jun. 23, 2010, directed to U.S. Appl. No. 11/812,384; 29 pages.
Prest et al., U.S. Office Action mailed Jun. 22, 2010, directed to U.S. Appl. No. 11/882,890; 15 pages.
Prest et al., U.S. Office Action mailed Jun. 22, 2010, directed to U.S. Appl. No. 11/812,383; 21 pages.
Prest et al., U.S. Office Action mailed Jun. 23, 2010, directed to U.S. Appl. No. 11/882,889; 13 pages.
Bollinger et al., U.S. Office Action mailed Jun. 25, 2010, directed to U.S. Appl. No. 11/842,724; 22 pages.
Hotelling, U.S. Office mailed Jun. 9, 2010, directed to U.S. Appl. No. 11/482,286; 21 pages.
Weber et al., U.S. Office Action mailed Jun. 7, 2010, directed to U.S. Appl. No. 11/856,530; 15 pages.
Ng et al., U.S. Office Action mailed Jul. 8, 2010, directed to U.S. Appl. No. 11/882,423; 19 pages.
EP Communication Pursuant to Article 94(3) EPC dated Jun. 24, 2010, directed to application No. 05786737.6; 8 pages.
Tsuk et al., U.S. Office Action mailed Aug. 6, 2010, directed to U.S. Appl. No. 11/610,190; 30 pages.
Zadesky et al., U.S. Office Action mailed Aug. 2, 2010, directed to U.S. Appl. No. 11/882,004; 9 pages.
Marriott et al., U.S. Office Action mailed Aug. 19, 2010, directed to U.S. Appl. No. 11/882,422; 13 pages.
Hotelling, U.S. Office Action mailed Aug. 18, 2010, directed to U.S. Appl. No. 11/882,424; 16 pages.
Bull, U.S. Office Action mailed Jul. 9, 2010, directed to U.S. Appl. No. 11/849,801; 13 pages.
KIPO's Notice of Preliminary Rejection dated Oct. 29, 2010, directed to counterpart application No. 10-2009-7017577; 4 pages.
Tsuk et al., U.S. Office Action mailed Nov. 1, 2010, directed to U.S. Appl. No. 11/959,918; 8 pages.
Tsuk et al., U.S. Office Action mailed Oct. 26, 2010, directed to U.S. Appl. No. 11/959,942; 27 pages.
Robbin et al., U.S. Office Action mailed Oct. 29, 2010, directed to U.S. Appl. No. 11/838,845; 8 pages.
Ng et al., U.S. Office Action mailed Oct. 26, 2010, directed to U.S. Appl. No. 11/882,423; 18 pages.
Zadesky et al., U.S. Office Action mailed Oct. 4, 2010, directed to U.S. Appl. No. 11/057,050; 31 pages.
McKillop et al., U.S. Office Action mailed Sep. 16, 2010, directed to U.S. Appl. No. 11/591,752; 14 pages.

Zadesky et al., U.S. Office Action mailed Sep. 29, 2010, directed to U.S. Appl. No. 11/882,003; 13 pages.

Hotelling, U.S. Office Action mailed Oct. 1, 2010, directed to U.S. Appl. No. 11/482,286; 28 pages.

Hotelling et al., U.S. Office Action mailed Oct. 27, 2010, directed to U.S. Appl. No. 11/483,008; 23 pages.

Weber et al., U.S. Office Action mailed Oct. 13, 2010, directed to U.S. Appl. No. 12/205,795; 15 pages.

U.S. Appl. No. 10/654,108, filed Sep. 2, 2003 entitled "Ambidextrous Mouse".

U.S. Appl. No. 10/789,676, filed Feb. 27, 2004 entitled "Shape Detecting Input Device".

"4-Wire Resistive Touchscreens" obtained from http://www.touchscreens.com/intro-touchtypes-4resistive.html generated Aug. 5, 2005.

"5-Wire Resistive Touchscreens" obtained from http://www.touchscreens.com/intro-touchtypes-resistive.html generated Aug. 5, 2005.

"A Brief Overview of Gesture Recognition" obtained from http://www.dai.ed.ac.uk/Cvonline/LOCA_COPIES/COHEN/gesture_overview.html, generated Apr. 20, 2004.

"Capacitive Touchscreens" obtained from http://www.touchscreens.com/intro-touchtypes-capacitive.html generated Aug. 5, 2005.

"Capacitive Position Sensing" obtained from http://www.synaptics.com/technology/cps.cfm generated Aug. 5, 2005.

"Comparing Touch Technologies" obtained from http://www.touchscreens.com/intro-touchtypes.html generated Oct. 10, 2004.

"Gesture Recognition" http://www.fingerworks.com/gesture_recognition.html, 2006.

"GlidePoint®" obtained from http://www.cirque.com/technology/technology_gp.html generated Aug. 5, 2005.

"How do touchscreen monitors know where you're touching?" obtained from http://www.electronics.howstuffworks.com/question716.html generated Aug. 5, 2005.

"How does a touchscreen work?" obtained from http://www.touchscreens.com/intro-anatomy.html generated Aug. 5, 2005.

"iGesture Products for Everyone (learn in minutes) Product Overview" FingerWorks.com, 2005.

"Infrared Touchscreens" obtained from http://www.touchscreens.com/intro-touchtypes-infrared.html generated Aug. 5, 2005.

"Mouse Emulation" FingerWorks obtained from http://www.fingerworks.com/gesture_guide_mouse.html generated Aug. 30, 2005.

"Mouse Gestures in Opera" obtained from http://www.opera.com/products/desktop/mouse/index.dml generated Aug. 30, 2005.

"Mouse Gestures," Optim oz, May 21, 2004.

"MultiTouch Overview" FingerWorks obtained from http://www.fingerworks.com/multoverview.html generated Aug. 30, 2005.

"Near Field Imaging Touchscreens" obtained from http://www.touchscreens.com/intro-touchtypes-nfi.html generated Aug. 5, 2005.

"PenTouch Capacitive Touchscreens" obtained from http://www.touchscreens.com/intro-touchtypes-pentouch.html generated Aug. 5, 2005.

"Surface Acoustic Wave Touchscreens" obtained from http://www.touchscreens.com/intro-touchtypes-saw.html generated Aug. 5, 2005.

"Symbol Commander" obtained from http://www.sensiva.com/symbolcomander/, generated Aug. 30, 2005.

"Tips for Typing" FingerWorks http://www.fingerworks.com/mini_typing.html generated Aug. 30, 2005.

"Touch Technologies Overview" 2001, 3M Touch Systems, Massachusetts.

"Wacom Components—Technology" obtained from http://www.wacom-components.com/english/tech.asp generated on Oct. 10, 2004.

"Watershed Algorithm" http://rsb.info.nih.gov/ij/plugins/watershed.html generated Aug. 5, 2005.

"FingerWorks—Gesture Guide—Application Switching," obtained from http://www.fingerworks.com/gesture_guide_apps.html, generated on Aug. 27, 2004, 1-pg.

"FingerWorks—Gesture Guide—Editing," obtained from http://www.fingerworks.com/gesure_guide_editing.html, generated on Aug. 27, 2004, 1-pg.

"FingerWorks—Gesture Guide—File Operations," obtained from http://www.fingerworks.com/gesture_guide_files.html, generated on Aug. 27, 2004, 1-pg.

"FingerWorks—Gesture Guide—Text Manipulation," obtained from http://www.fingerworks.com/gesture_guide_text_manip.html, generated on Aug. 27, 2004, 2-pg.

"FingerWorks—Gesture Guide—Tips and Tricks," obtained from http://www.fingerworks.com/gesture_guide_tips.html, generated Aug. 27, 2004, 2-pgs.

"FingerWorks—Gesture Guide—Web," obtained from http://www.fingerworks.com/gesture_guide_web.html, generated on Aug. 27, 2004, 1-pg.

"FingerWorks—Guide to Hand Gestures for USB Touchpads," obtained from http://www.fingerworks.com/igesture_userguide.html, generated Aug. 27, 2004, 1-pg.

"FingerWorks—iGesture—Technical Details," obtained from http://www.fingerworks.com/igesture_tech.html, generated Aug. 27, 2004, 1-pg.

"FingerWorks—The Only Touchpads with Ergonomic Full-Hand Resting and Relaxation!" obtained from http://www.fingerworks.com/resting.html, Copyright 2001, 1-pg.

"FingerWorks—Tips for Typing on the Mini," obtained from http://www.fingerworks.com/mini_typing.html, generated on Aug. 27, 2004, 2-pgs.

"iGesture Pad—the MultiFinger USB TouchPad with Whole-Hand Gestures," obtained from http://www.fingerworks.com/igesture.html, generated Aug. 27, 2004, 2-pgs.

Bier, et al., "Toolglass and Magic Lenses: The see-through interface" In James Kijiya, editor, Computer Graphics (SIGGRAPH '93 Proceedings), vol. 27, pp. 73-80, Aug. 1993.

Douglas et al., *The Ergonomics of Computer Pointing Devices* (1997).

European Search Report in EP 1 621 989 (@ *Beyer Weaver & Thomas, LLP*) dated Mar. 27, 2006.

EVB Elektronik "TSOP6238 IR Receiver Modules for Infrared Remote Control Systems" dated Jan. 2004 1-pg.

Fisher et al., "Repetitive Motion Disorders: The Design of Optimal Rate-Rest Profiles," Human Factors, 35(2):283-304 (Jun. 1993).

Fukumoto, et al., "ActiveClick: Tactile Feedback for Touch Panels," In CHI 2001 Summary, pp. 121-122, 2001.

Fukumoto and Yoshinobu Tonomura, "Body Coupled Fingering: Wireless Wearable Keyboard," *CHI 97*, pp. 147-154 (Mar. 1997).

Hardy, "Fingerworks" Mar. 7, 2002; BBC World On Line.

Hillier and Gerald J. Lieberman, *Introduction to Operations Research* (1986).

International Search Report dated Mar. 3, 2006 (PCT/US 05/03325; 119-0052WO).

Jacob et al., "Integrality and Separability of Input Devices," *ACM Transactions on Computer-Human Interaction*, 1:3-26 (Mar. 1994).

Kinkley et al., "Touch-Sensing Input Devices," in CHI '99 Proceedings, pp. 223-230, 1999.

KIONX "KXP84 Series Summary Data Sheet" copyright 2005,dated Oct. 21, 2005, 4-pgs.

Lee et al., "A Multi-Touch Three Dimensional Touch-Sensitive Tablet," in CHI '85 Proceedings, pp. 121-128, 2000.

Lee, "A Fast Multiple-Touch-Sensitive Input Device," Master's Thesis, University of Toronto (1984).

Matsushita et al., "HoloWall: Designing a Finger, Hand, Body and Object Sensitive Wall," In Proceedings of UIST '97, Oct. 1997.

Quantum Research Group "QT510 / QWheel™ Touch Slider IC" copyright 2004-2005, 14-pgs.

Quek, "Unencumbered Gestural Interaction," *IEEE Multimedia*, 3:36-47 (Winter 1996).

Radwin, "Activation Force and Travel Effects on Overexertion in Repetitive Key Tapping," *Human Factors*, 39(1):130-140 (Mar. 1997).

Rekimoto "SmartSkin: An Infrastructure for Freehand Manipulation on Interactive Surfaces" CHI 2002, Apr. 20-25, 2002.

Rekimoto et al., "ToolStone: Effective Use of the Physical Manipulation Vocabularies of Input Devices," In Proc. of UIST 2000, 2000.

Rubine et al., "Programmable Finger-Tracking Instrument Controllers," *Computer Music Journal*, vol. 14, No. 1 (Spring 1990).

Rutledge et al., "Force-To-Motion Functions for Pointing," Human-Computer Interaction—Interact (1990).

Subatai Ahmad, "A Usable Real-Time 3D Hand Tracker," Proceedings of the 28th Asilomar Conference on Signals, Systems and Computers—Part 2 (of2), vol. 2 (Oct. 1994).

Texas Instruments "TSC2003 / I2C Touch Screen Controller" Data Sheet SBAS 162, dated Oct. 2001, 20-pgs.

Wellner, "The Digital Desk Calculators: Tangible Manipulation on a Desk Top Display" In ACM UIST '91 Proceedings, pp. 27-34, Nov. 1991.

Williams, "Applications for a Switched-Capacitor Instrumentation Building Block" Linear Technology Application Note 3, Jul. 1985, pp. 1-16.

Yamada et al., "A Switched-Capacitor Interface for Capacitive Pressure Sensors" IEEE Transactions on Instrumentation and Measurement, vol. 41, No. 1, Feb. 1992, pp. 81-86.

Yeh et al., "Switched Capacitor Interface Circuit for Capacitive Transducers" 1985 IEEE.

Zhai et al., "Dual Stream Input for Pointing and Scrolling," *Proceedings of CHI '97 Extended Abstracts* (1997).

Zimmerman et al., "Applying Electric Field Sensing to Human-Computer Interfaces," In CHI '85 Proceedings, pp. 280-287, 1995.

U.S. Appl. No. 10/774,053, filed Feb. 5, 2004.

U.S. Appl. No. 11/140,529, filed May 27, 2005 which is a Reissue of 6,570,557 listed above.

U.S. Appl. No. 11/381,313, filed May 2, 2006 entitled "Multipoint Touch Surface Controller".

U.S. Appl. No. 11/332,861, filed Jan. 13, 2006 which is a Reissue of 6,677,932 listed above.

U.S. Appl. No. 11/380,109, filed Apr. 25, 2006 entitled "Keystroke Tactility Arrangement on Smooth Touch Surface."

U.S. Appl. No. 11/428,501, filed Jul. 3, 2006 entitled "Capacitive Sensing Arrangement," which is a Continuation of US 2005/0104867 listed above.

U.S. Appl. No. 11/428,503, filed Jul. 3, 2006 entitled "Touch Surface" which is a Continuation of US 2005/0104867 listed above.

U.S. Appl. No. 11/428,506, filed Jul. 3, 2006 entitled "User Interface Gestures" which is a Continuation of US 2005/0104867 listed above.

U.S. Appl. No. 11/428,515, filed Jul. 3, 2006 entitled "User Interface Gestures" which is a Continuation of US 2005/0104867 listed above.

U.S. Appl. No. 11/428,522, filed Jul. 3, 2006 entitled "Identifying Contacts on a Touch Surface" which is a Continuation of US 2005/0104867 listed above.

U.S. Appl. No. 11/428,521, filed Jul. 3, 2006 entitled "Identifying Contacts on a Touch Surface" which is a Continuation of US 2005/0104867 listed above.

U.S. Appl. No. 11/426,078, filed Jun. 23, 2006 entitled "Electronic Device Having Display and Surrounding Touch Sensitive Bezel for User Interface and Control" which is a Continuation-In-Part of 2006/0197753 listed above.

U.S. Appl. No. 11/278,080, filed Mar. 30, 2006 entitled "Force Imaging Input Device and System".

U.S. Appl. No. 11/382,402, filed May 9, 2006 entitled "Force and Location Sensitive Display" which is a Continuation of U.S. Appl. No. 11/278,080 listed above.

International Search Report in corresponding PCT application No. PCT/US2006/008349 dated Oct. 6, 2006.

"About Quicktip®" www.logicad3d.com/docs/qt.html, downloaded Apr. 8, 2002.

"Alps Electric Ships GlidePoint Keyboard for the Macintosh; Includes a GlidePoint Touchpad, Erase-Eaze Backspace Key and Contoured Wrist Rest," Business Wire (Jul. 1, 1996).

"Alps Electric introduces the GlidePoint Wave Keyboard; combines a gently curved design with Alps' advanced GlidePoint Technology," Business Wire (Oct. 21, 1996).

"Apple Presents iPod: Ultra-Portable MP3 Music Player Puts 1,000 Songs in Your Pocket," retreived from http://www.apple.com/pr/library/2001/oct/23ipod.html on Oct. 23, 2001.

"Apple Unveils Optical Mouse and New Pro Keyboard," Press Release, Jul. 19, 2000.

"APS show guide to exhibitors," Physics Today 49(3) (Mar. 1996).

"Atari VCS/2600 Peripherals," www.classicgaming.com/gamingmuseum/2006p.html, downloaded Feb. 28, 2007, pp. 1-15.

"Der Klangmeister," Connect Magazine, Aug. 1998.

"Design News literature plus," Design News 51(24) (Dec. 18, 1995).

"Neuros MP3 Digital Audio Computer," www.neurosaudio.com, downloaded Apr. 9, 2003.

"OEM Touchpad Modules" website www.glidepoint.com/sales/modules.index.shtml, downloaded Feb. 13, 2002.

"Product Overview—ErgoCommander®," www.logicad3d.com/products/ErgoCommander.htm, downloaded Apr. 8, 2002.

"Product Overview—SpaceMouse® Classic," www.logicad3d.com/products/Classic.htm, downloaded Apr. 8, 2002.

"System Service and Troubleshooting Manual," www.dsplib.com/intv/Master, downloaded Dec. 11, 2002.

"Synaptics Tough Pad Interfacing Guide," Second Edition, Mar. 25, 1998, Synaptics, Inc., San Jose, CA, pp. 1-90.

"Triax Custom Controllers due; Video Game Controllers," HFD—The Weekly Home Furnishing Newspaper 67(1) (Jan. 4, 1993).

Ahl, David, "Controller Update," Creative Computing Vo. 9, No. 12, Dec. 1983.

Baig, E.C., "Your PC Just Might Need a Mouse," U.S. News & World Report 108(22) (Jun. 4, 1990).

Bang & Olufsen Telecom a/s, "BeoCom 6000 User Guide 2000,", Feb. 1999.

Bartimo, Jim, "The Portables: Travelling Quickly," Computerworld (Nov. 14, 1983).

BeoCom 6000, Sales Training Brochure, date unknown, at least 2004.

Bray, "Phosphors help switch on xenon," Physics in Action, pp. 1-3, Apr. 1999.

Brink et al., "Pumped-up portables," U.S. News & World Report 116(21) (May 30, 1994).

Brown et al., "Windows on Tablets as a Means of Achieving Virtual Input Devices," Human-Computer Interaction—Interact '90 (1990).

Buxton et al., "Issues and Techniques in Touch-Sensitive Tablet Input," Computer Graphics 19(3), Proceedings of SIGGRAPH '85 (1985).

Chapweske, Adam "PS/2 Mouse/Keyboard Protocol," 1999, http://panda.cs.ndsu.nodak.edu/~achapwes/PICmicro/PS2/ps2.htm.

Chen et al., "A Study in Interactive 3-D Rotation Using 2-D Control Devices," Computer Graphics 22(4) (Aug. 1988).

Chinese Office Action issue Dec. 29, 2006, directed to CN Application No. 200510103886.3, 25 pages.

De Meyer, Kevin, "Crystal Optical Mouse," Feb. 14, 2002, Heatseekerz, Web Article 19.

Evans et al., "Tablet-based Valuators that Provide One, Two, or Three Degrees of Freedom," Computer Grahics 15(3) (Aug. 1981).

EVB Elektronik "TSOP6238 IR Receiver Modules for Infrared Remote Control Systems" dated Jan. 2004 1 page.

Fiore, "Zen Touchpad," Cornell University, May 2000.

Gadgetboy, "Point and click with the latest mice," CNET Asia Product Review, www.asia.cnet.com/reviews...are/gadgetboy/0,39001770,380235900,00.htm, downloaded Dec. 5, 2001.

Gfroerer, "Photoluminescence in Analysis of Surfaces and Interfaces," Encyclopedia of Analytical Chemistry, pp. 1-23, Copyright John Wiley & Sons Ltd, Chichester, 2000.

Jesitus, John, "Broken promies?", Industry Week/IW 246(20) (Nov. 3, 1997).

Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).

Kobayashi et al. (1997) "Dynamic Soundscape: Mapping Time to Space for Audio Browsing," Computer Human Interaction: 16 pages.

Kobayashi et al. "Development of the Touch Switches with the Click Response," Koukuu Denshi Gihou No. 17, pp. 44-48 (Mar. 1994) (published by the Japan Aviation Electronics Industry, Ltd.).

Letter re: Bang & Olufsen a/s by David Safran, Nixon Peabody, LLP May 21, 2004.

Luna Technologies International, Inc., Luna Photoluminescent Safety Products, "Photoluminescence—What is Photoluminescence?" from website at http://www.lunaplast.com/photoluminescence.com on Dec. 27, 2005.

"Manufactures," Laser Focus World, Buyers Guide '96, 31(12) (Dec. 1995).

Mims, Forrest M., III, "A Few Quick Pointers; Mouses, Touch Screens, Touch Pads, Light Pads, and the Like Can Make System Easier to Use," Computers & Electronics (22) (May 1984).

Nass, Richard, "Touchpad input device goes digital to give portable systems a desktop 'mouse-like' feel," Electronic Design 44(18) (Sep. 3, 1996).

"National Design Engineering Show," Design News 52(5) (Mar. 4, 1996).

Perenson, Melissa, "New & Improved: Touchpad Redux," PC Magazine (Sep. 10, 1996).

Petersen, Marty, "Koala Pad Touch Tablet & Micro Illustrator Software," InfoWorld (Oct. 10, 1983).

Petruzzellis, "Force-Sensing Resistors," Electronics Now 64(3) (Mar. 1993).

Photographs of Innovation 2000 Best of Show Award Presented at the 2000 Int'l CES Innovations 2000 Design & Engineering Showcase, 1 page, 2000.

"Preview of exhibitor booths at the Philadelphia show," Air Conditioning, Heating & News 200(2) (Jan. 13, 1997).

"Product news," Design News 53(9) (May 5, 1997).

"Product news," Design News 53(11) (Jun. 9, 1997).

Sony presents "Choice Without Compromise" at IBC '97 M2 Presswire (Jul. 24, 1997).

Spiwak, Marc, "A Great New Wireless Keyboard," Popular Electronics 14(12) (Dec. 1997).

Spiwak, Marc, "A Pair of Unusual Controllers," Popular Electronics 14(4) (Apr. 1997).

Soderholm, Lars G., "Sensing Systems for 'Touch and Feel,'" Design News (May 8, 1989): pp. 72-76.

Sylvania, "Intellvision™ Intelligent Television Master Component Service Manual," pp. 1, 2 and 8, 1979.

Tessler, Franklin, "Point Pad," Macworld 12(10) (Oct. 1995).

Tessler, Franklin, "Touchpads," Macworld 13(2) (Feb. 1996).

Tessler, Franklin, "Smart Input: How to Chose from the New Generation of Innovative Input Devices," Macworld 13(5) (May 1996).

SanDisk Sansa Connect User Guide; 29 pages, 2007.

"Touchpad," Notebook PC Manual, ACER Information Co. Ltd., Feb. 16, 2005, pp. 11-12.

Translation of Trekstor's Defense Statement to the District Court Mannheim of May 23, 2008; 37 pages.

"Diamond Multimedia Announces Rio PMP300 Portable MP3 Music Player," at http://news.harmony-central.com/Newp/1998/Rio-PMP300.html visited on May 5, 2008. (4 pages).

Summons to attend oral proceedings pursuant to Rule 115(1) EPC mailed Dec. 2, 2010, directed EP application No. 05786737.6; 7 pages.

KIPO's Notice of Preliminary Rejection dated Oct. 29, 2010, directed to counterpart application No. 10-2009-7017577; 4 pages.

JP OA mailed Oct. 25, 2010, directed to counterpart JP Application No. 2007-525885; 10 pages.

Ng et al., U.S. Office Action mailed Dec. 9, 2010, directed to U.S. Appl. No. 11/394,493; 13 pages.

Zadesky et al., U.S. Office Action mailed Nov. 16, 2010, directed to U.S. Appl. No. 11/477,469; 13 pages.

Lampell, U.S. Office Action mailed Dec. 3, 2010, directed to U.S. Appl. No. 11/530,807; 17 pages.

Lampell et al., U.S. Office Action mailed Dec. 22, 2010, directed to U.S. Appl. No. 11/882,427; 16 pages.

Hotelling, U.S. Office Action mailed Dec. 8, 2010, directed to U.S. Appl. No. 11/482,286; 33 pages.

Zadesky et al, U.S. Office Action mailed Feb. 1, 2011, directed to U.S. Appl. No. 11/882,004; 16 pages.

Bull, U.S. Office Action mailed Feb. 4, 2011, directed to U.S. Appl. No. 11/849,801; 22 pages.

Weber et al, U.S. Office Action mailed Jan. 7, 2011, directed to U.S. Appl. No. 11/856,530; 13 pages.

Weber et al., U.S. Office Action mailed Jan. Jan. 7, 2011, directed to U.S. Appl. No. 12/205,795; 21 pages.

Weber et al., U.S. Office Action mailed Feb. 17, 2011, directed to U.S. Appl. No. 12/844,502; 11 pages.

* cited by examiner

Figure 1

METHOD OF INCREASING THE SPATIAL RESOLUTION OF TOUCH SENSITIVE DEVICES

CROSS-REFERENCE TO RELATED APPLICATIONS

This application is related to and claims priority to Provisional U.S. Patent Application Ser. No. 60/522,107, filed Aug. 16, 2004, having the same title and inventors as herein, which provisional application is hereby incorporated by reference in its entirety.

BACKGROUND

The present invention relates generally to the field of touch sensitive devices, and, in particular, to the field of optimizing capacitive sensing electrode shape and arrangement to increase the effective spatial resolution and/or the physical range of the sensing device using a limited number of sensors.

In a capacitive touch sensitive device, each sensor, of which there may be many, comprises a conductive pad that forms one plate of a capacitor and a way to measure the capacitance of the conductive pad in conjunction with another movable conductive object. The movable conductive object is typically a finger or stylus that is kept at a minimum distance from the conductive pad by a non-conductive spacer. The two conductive objects (conductive pad and movable conductive object), along with the non-conductive dielectric between them, form a capacitor. As known to those skilled in the art, the capacitance of this capacitor changes as the distance and/or overlap between the objects changes. In a typical device the number of conductive pads (henceforth called electrodes), the size of the electrodes, and the spacing between the electrodes determine the physical range and spatial resolution of the touch sensitive device.

In typical implementations of capacitive touch sensitive devices the position of a finger gliding over a dielectric-covered array of sensor electrodes is determined by observing the change in capacitance as the finger moves on the surface. Scanning and processing circuitry measures the change in capacitance due to the varying overlap between the finger and a given electrode. If a finger is large enough to partially overlap multiple neighboring electrodes then interpolation allows the finger position to be determined to a resolution much higher than the electrode spacing. The interpolation calculation follows the classic centroid formula: the sum of the signal values at each electrode is multiplied by its coordinate and divided by the sum of all the signal values. This technique works equally well with linear arrays of row and column electrodes, radial arrays of electrodes arranged as spokes in a wheel, or two-dimensional arrays of electrodes arranged to fill a planar space. Special electrode shapes intended to boost interpolation accuracy or resolution are the main distinction between the various related art designs.

For example, U.S. Pat. No. 5,463,388 to Boie et al., which is hereby incorporated by reference, teaches fingertip sized, interleaved electrode spirals to minimize the number of electrodes needed for a multi-touch sensor array. The interleaving ensures that a finger overlaps multiple electrodes even when centered on a particular electrode and electrodes are one fingertip width apart. Stable interpolation generally requires continual finger overlap with multiple electrodes.

Seonkyoo Lee, "A Fast Multiple-Touch-Sensitive Input Device," Master's Thesis, University of Toronto (1984) teaches virtual grouping of square electrode cells to more quickly determine whether an object is present within a neighborhood. U.S. Pat. No. 5,767,457 to Gerpheide teaches locating an object by finding the balance point of a virtual grouping of electrodes on either side of the object. Both of these references are hereby incorporated by reference.

Finally, U.S. Pat. Nos. 5,543,590; 5,543,591; 5,880,411; and 6,414,671; each assigned to Synaptics and hereby incorporated by reference, teach dense interleaving of row and column spanning electrodes in the same plane by shaping each row electrode as a connected string of diamond shapes, and each column electrode as a string of diamond shapes with centers offset from the row diamond centers.

However, additional improvement in resolution is still desired for such devices. Although resolution may be increased by adding additional sensor elements, dictates of scanning time, circuitry cost, and power consumption simultaneously drive systems towards as few sensor elements as possible. Therefore, there is a need in the art of sensor array design for sensor arrangements that maximize resolution with a limited number of sensors. Disclosed herein is a touch sensitive device that addresses the needs of the prior art for increased resolution and decreased sensor element count.

SUMMARY

Disclosed herein is a capacitive touch sensitive device. One aspect of the touch sensitive device described herein is a reduction in the number of sensor circuits needed for circular or linear capacitive touch sensitive devices while maintaining the same resolution and absolute position determination for a single object. A related aspect of the touch sensitive device described herein a coding pattern that allows each sensor circuit of a capacitive touch sensitive device to share multiple electrodes at specially chosen locations in a sensor array such that the ability to determine the absolute position of a single object over the array is not compromised.

DETAILED DESCRIPTION

A capacitive touch sensor is described herein. The following embodiments of the invention are illustrative only and should not be considered limiting in any respect.

The touch sensitive device described herein allows each sensor circuit to share two or more electrodes by dispersing the shared electrodes in a particular pattern. The electrodes are shared in the sense that they both electrically connect to the same capacitive measuring sensor circuit through a common conductor without the need for multiplexing switches. Preferably, the distance separating a pair of shared electrodes, i.e., the dispersal distance, is one-third the number of electrodes in the device. The touch sensitive device employed herein further includes a particular coding pattern so that: 1) adjacent electrodes never share the same sensor circuit; and 2) the electrodes sharing the same sensor circuit are always separated from one another by the dispersal distance, i.e., roughly one third of the number of electrodes.

Figure 1:
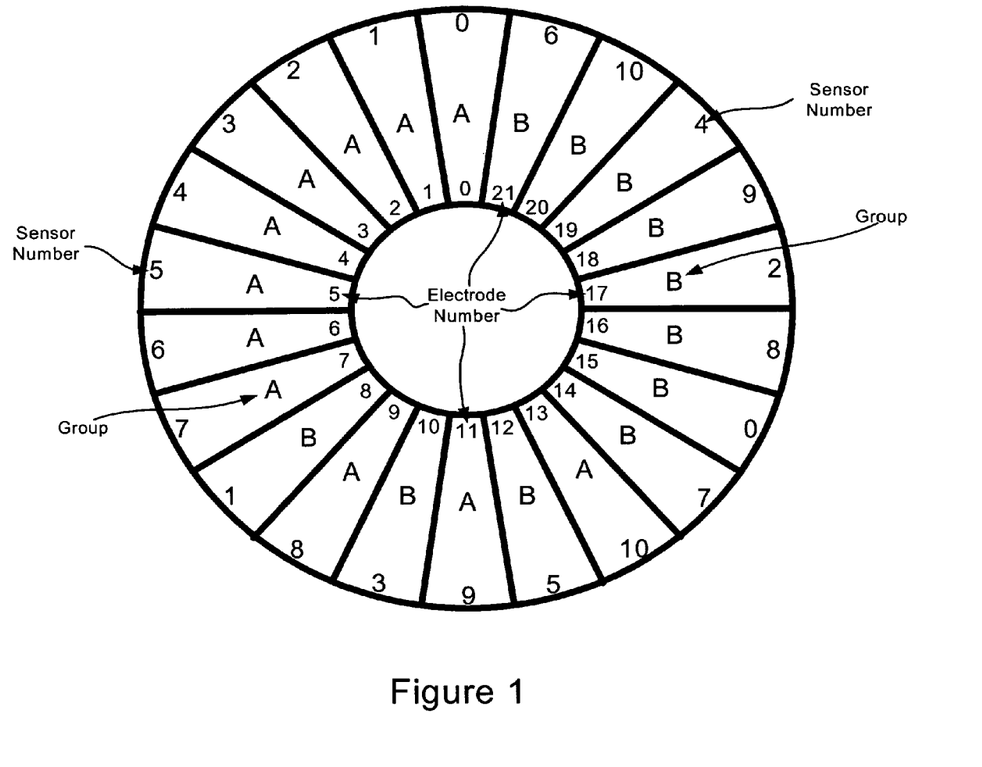
FIG. 1 illustrates a touch sensitive device employing certain teachings of the present invention.

A touch sensitive device incorporating the teachings herein is illustrated in FIG. 1. The capacitive touch sensitive device 100 is a one-dimensional circular array, although other arrangements, e.g., linear arrays, etc., could also be used. The circular array includes 22 electrodes, numbered 0-21. The circular array includes only 11 sensor circuits. These sensor circuits may take the form of various sensor circuits known to those skilled in the art. One such circuit is disclosed in U.S. Pat. No. 6,323,846, entitled "Method and Apparatus for Integrating Manual Input," which is hereby incorporated by reference. The sensor circuit corresponding to each electrode is designated by a number located at the outer portion of each sensor electrode.

The touch sensitive device 100 thus shares two electrodes per sensor. However, additional electrodes may be shared with each sensor. Each electrode in FIG. 1 also includes a group designator, either "A" or "B". Each group A electrode shares a sensor with a group "B" electrode. As noted above, the preferred dispersal distance (i.e., the distance between two electrodes sharing a sensor) is a span of approximately one-third the number of sensors, and thus approximately one-third of a characteristic dimension of the device. Thus for the circular device illustrated in FIG. 1, the preferred dispersal distance is approximately one-third the circumference of the circle, thus encompassing approximately one third of the sensors. Any two adjacent electrodes and the two electrodes that share sensor circuits will thus be evenly spaced, a third of the way around the circle. For example, electrode 1 in group A shares sensor 1 with electrode 8 in group B. Electrode 1 is located at approximately the eleven o'clock position, while electrode 8 is located at approximately the seven o'clock position. Similarly, electrode 0 in group A shares sensor 0 with electrode 15 in group B. Electrode 0 is located at the twelve o'clock position, while electrode 15 is located at approximately the four o'clock position.

The sensor may alternatively be constructed as a one-dimensional linear array. For such a sensor, the dispersal pattern is basically the same as for a circular array: linear arrays can be treated as a circular array that has been broken between two electrodes and uncurled. Again, it is preferred that the dispersal difference between two electrodes sharing a sensor be about one-third the characteristic dimension of the device, which for a linear sensor is the length of the device.

Obviously, because multiple electrodes share a sensing circuit, the absolute position of an object in contact (proximity) with a single electrode cannot be determined. For absolute position interpolation to work properly in a device constructed according to the principles herein, each electrode must be sufficiently narrow enough that the object being tracked, usually a finger or conductive stylus, overlaps multiple (e.g., two or three) adjacent electrodes. Likewise, to eliminate any ambiguity, the object being tracked must be smaller than the dispersal distance so that it does not overlap both shared electrodes of any sensor circuit.

While other electrode sharing patterns are possible, some of these can not be used to unambiguously determine the position of a finger. For example, an electrode arrangement with a dispersal distance of half the array size would fail. For a circular array, this would correspond to sharing of electrodes on opposite sides of the circle, 180 degrees from one another. No matter how decoding and interpolation were done, the system could never tell whether the finger or stylus was really at the opposite position halfway around the circle.

Because each sensor circuit is connected to multiple electrodes, the sensor illustrated herein requires a decoding method that finds the set of electrodes with the largest signals, then decides which of two possible electrode groups would attribute these largest signals to adjacent rather than scattered electrodes. Once this best decoding is known, classic centroid interpolation can commence amongst the adjacent electrodes. For purposes of centroid computation, each sensor's entire signal is attributed to its electrode in the adjacent group, leaving its other electrode from the dispersed group with zero signal and zero contribution to the centroid. Assuming the signal to noise ratio of the sensor circuits is adequate, the sensor described herein offers the same position resolution as a conventional position detector that has a separate sensor circuit for each electrode.

The example of computer instructions below demonstrates the algorithm used in the present invention to find the position of a finger or stylus that is touching somewhere on the circular array of electrodes. Sensor and electrode mappings are held in look-up-tables (LUTs) to minimize the computation needed for decoding the location of the touching finger. The LUTs map electrode number to sensor number for each group (Sensor_to_A_type_electrode, Sensor_to_B_type_electrode), map the sensor number corresponding to the adjacent electrode (next_X_electrode_sensor, previous_X_electrode_sensor, where X=A or B), and electrode number to sensor number (Electrode_to_Sensor). The use of these LUTs simplifies the calculation of the finger location using the present invention but they are not necessary.

A brief description of the algorithm implemented by the code is as follows:

1. The sensor array is scanned and the signal values corresponding to each sensor are collected.
2. The sensor having maximum strength signal is located using code segment findMaxSensor.
3. The electrode under which the finger is located is computed using code segment findMaxElectrode.
4. The centroid is computed using code segment computeCentroid.
5. Steps 1-4 are repeated.

```
#define NUM_SENSORS 11
#define NUM_ELECTRODES 22
// Group A electrode and sensor mappings
Sensor_to_A_type_electrode[NUM_SENSORS] = {0,1,2,3,
4,5,6,7,9,11,13};
next_A_electrode_sensor[NUM_SENSORS] = {1,2,3,4,5,6,7,
1,3,5,7};
previous_A_electrode_sensor[NUM_SENSORS] = {6,0,1,2,3,4,5,
6,1,3,5};
// Group B electrode and sensor mappings
Sensor_to_B_type_electrode[NUM_SENSORS] = {15,8,17,
10,19,12,21,14,16,18,20};
next_B_electrode_sensor[NUM_SENSORS] = {8,8,9,9,10,10,0,0,2,
4,6};
previous_A_electrode_sensor[NUM_SENSORS] = {7,7,8,8,9,9,10,
10,0,2,4};
// Electrode to sensor mapping
Electrode_to_Sensor[NUM_ELECTRODES] = {
    0, // 0
    1, // 1
    2, // 2
    3, // 3
    4, // 4
    5, // 5
    6, // 6
    7, // 7
    1, // 8
    8, // 9
    3, // 10
    9, // 11
    5, // 12
    10, // 13
    7, // 14
    0, // 15
    8, // 16
    2, // 17
    9, // 18
    4, // 19
    10, // 20
    6 // 21
};
// This code finds the sensor that has the strongest signal
```

-continued

```
void findMaxSensor(void) {
    unsigned char maxval, i;
    max_sensor = 0;
    maxval = 0;
    for (i = 0; i < NUM_SENSORS; i++) {
        if (SensorData[e] > maxval) {
            maxval = SensorData[i];
            max_sensor = i;
        }
    }
}
// This code finds the electrode that has the strongest
signal
// It starts by examining the electrodes adjacent to those electrodes
// that belong to the maximum sensor. The electrode being touched is
// identified by comparing the signal strength of the two electrodes on
// either side of the electrodes belonging to the maximum sensor. The
// group with the largest signal is the one under the touching finger.
void findMaxElectrode(void) {
    int Asum, Bsum;
    Asum = SensorData[next_A_electrode_sensor[max_
sensor]] +
            SensorData[previous_A_electrode_sensor[max_
sensor]];
    Bsum = SensorData[next_A_electrode_sensor[max_sensor]] +
            SensorData[previous_B_electrode_sensor[max_
sensor]];
    if (Asum > Bsum) {
        maxelectrode = Sensor_to_A_type_electrode
[max_sensor];
    } else {
        maxelectrode = Sensor_to_B_type_electrode
[max_sensor];
    }
}
// This code computes the centroid corresponding to the touching
// finger using the location decoded using the algorithm of the
invention.
#define CENTMULTIPLIER 8
void computeCentroid(void) {
    int pos_sum, electrode;
    char offset;
    int sval;
    pos_sum = 0;
    total_signal = 0;
    //sum from maxelectrode in positive direction for two electrodes
    for (offset = 1; offset < 3; offset++) {
        electrode = maxelectrode + offset;
        if (electrode >= NUM_ELECTRODES) {
            electrode -= NUM_ELECTRODES;
        }
        sval = SensorData[Electrode_to_Sensor[electrode]];
        total_signal += sval;
        pos_sum += CENTMULTIPLIER*sval*offset;
    }
    //sum from maxelectrode in negative direction for two electrodes
    for (offset = 1; offset <3; offset++) {
        electrode = maxelectrode – offset;
        if (electrode < 0) {
            electrode += NUM_ELECTRODES;
        }
        sval = SensorData[Electrode_to_Sensor[electrode]];
        total_signal += sval;
        pos_sum -= CENTMULTIPLIER*sval*offset;
    }
    total_signal += SensorData[maxe];
    sval = pos_sum/total_signal;
    sval += CENTMULTIPLIER*maxelectrode; //absolute offset
by maxelectrode
    if(sval < 0) {
        Centroid = 176 + sval;
    }
    else {
        Centroid = sval;
    }
}
```

While the invention has been disclosed with respect to a limited number of embodiments, numerous modifications and variations will be appreciated by those skilled in the art. It is intended that all such variations and modifications fall with in the scope of the following claims.

What is claimed is:

1. A touch sensitive device configured to track a finger, the device comprising:
    a first plurality of touch sensitive electrodes, each of the touch sensitive electrodes being associated with one of at least a first electrode group and a second electrode group; and
    a second plurality of sense circuits,
    wherein the second plurality of sense circuits is less than the first plurality of touch sensitive electrodes such that at least one sense circuit is shared between more than one of the touch sensitive electrodes;
    wherein each of the touch sensitive electrodes that share the at least one sense circuit are spatially separated from each other by a dispersal distance and are associated with a different one of the first and second electrode groups,
    wherein each of the touch sensitive electrodes is directly connected to the at least one sense circuit through a common conductor without multiplexing switches,
    wherein the touch sensitive electrodes are configured to enable the finger to overlap multiple adjacent electrodes and the dispersal distance is large enough to prevent the finger from overlapping the touch sensitive electrodes that share a sense circuit,
    wherein the plurality of sense circuits are configured to be scanned to collect a signal value corresponding to each of the plurality of sense circuits,
    wherein a sense circuit having a maximum signal value and first and second touch sensitive electrodes that share the sense circuit having the maximum signal value are identified,
    the first and second identified touch sensitive electrodes being spatially separated from each other by a dispersal distance and being associated with a different one of the first and second electrode groups,
    wherein one of the first and second identified touch sensitive electrodes is identified as a touched electrode by comparing a signal strength of electrodes on either side of the first identified touch sensitive electrode with a signal strength of electrodes on either side of the second identified touch sensitive electrode, and
    wherein a centroid of the finger being tracked is computed with reference to the touched electrode.

2. The touch sensitive device of claim 1 wherein the dispersal distance is approximately one-third of a characteristic dimension of the touch sensitive device.

3. The touch sensitive device of claim 1 wherein each sense circuit is directly connected to two touch sensitive electrodes.

4. The touch sensitive device of claim 1 wherein the plurality of touch sensitive electrodes are arranged in a circular array.

5. The touch sensitive device of claim 4 wherein the dispersal distance is approximately one-third the circumference of the circular array.

6. The touch sensitive device of claim 4 wherein each sense circuit is directly connected to two touch sensitive electrodes.

7. The touch sensitive device of claim 1 wherein the touch sensitive electrodes are arranged in a linear array.

8. The touch sensitive device of claim 7 wherein the dispersal distance is approximately one-third the length of the linear array.

9. A method of tracking a finger used in conjunction with a touch sensitive device, wherein the touch sensitive device comprises a plurality of electrodes and a plurality of sense circuits, wherein each of the electrodes is associated with one of at least a first electrode group and a second electrode group and wherein at least one of the sense circuits is directly connected to more than one electrode through a common conductor without multiplexing switches, the method comprising:

configuring the electrodes to enable the finger to overlap multiple adjacent electrodes;

spatially separating each of the electrodes that share a sense circuit by a dispersal distance large enough to prevent the finger from overlapping the electrodes that share the sense circuit and associating each of the electrodes that share a sense circuit with a different one of the first and second electrode groups;

scanning the plurality of sense circuits to collect a signal value corresponding to each of the plurality of sense circuits;

identifying, from the plurality of sense circuits, a sense circuit having a maximum signal value and first and second electrodes that share the sense circuit having the maximum signal value, the first and second identified electrodes being spatially separated from each other by a dispersal distance and being associated with a different one of the first and second electrode groups;

identifying one of the first and second identified electrodes as a touched electrode by comparing a signal strength of electrodes on either side of the first identified electrode with a signal strength of electrodes on either side of the second identified electrode; and computing a centroid of the finger being tracked with reference to the touched electrode.

10. The method of claim 9 wherein sensor and electrode mappings required for identifying the sense circuit and identifying the electrode are stored in look up tables.

11. A capacitive touch sensitive device configured to determine a position of a finger, the device comprising:

a first plurality of electrodes arranged in an array, the array having at least a first dimension, each of the electrodes being associated with one of at least a first electrode group and a second electrode group, a second plurality of sensor circuits, the first plurality of electrodes being greater than the second plurality of sensor circuits, each sensor circuit being associated with at least two non-adjacent electrodes, the two non-adjacent electrodes being spaced by a dispersal distance equal to less than half of the first dimension and being associated with a different one of the first and second electrode groups, wherein at least one of the sensor circuits is directly connected to more than one electrode through a common conductor without multiplexing switches, wherein the electrodes are configured to enable the finger to overlap multiple adjacent electrodes and the dispersal distance is large enough to prevent the finger from overlapping the non-adjacent electrodes associated with the sensor circuit, wherein the plurality of sense circuits are configured to be scanned to collect a signal value corresponding to each of the plurality of sense circuits, wherein a sense circuit having a maximum signal value and first and second electrodes that share the sense circuit having the maximum signal value are identified, the first and second identified electrodes being spatially separated from each other by a dispersal distance and being associated with a different one of the first and second electrode groups, wherein one of the first and second identified electrodes is identified as a touched electrode by comparing a signal strength of electrodes on either side of the first identified electrode with a signal strength of electrodes on either side of the second identified electrode, and wherein a centroid of the finger being tracked is computed with reference to the touched electrode.

12. The device of claim 11 wherein the first plurality of electrodes is equal to twice the second plurality of sensor circuits.

13. The device of claim 11 wherein the dispersal distance is equal to approximately one-third the first dimension.

14. The device of claim 11 wherein approximately one third of the electrodes are disposed between the two non-adjacent electrodes.

15. A method of tracking a finger using the device of claim 11, the method comprising:

identifying a sensor circuit associated with a maximum signal value, identifying an electrode associated with a maximum signal value, the electrode corresponding to the sensor circuit having a maximum signal value, wherein the sensor circuit is directly connected to the electrode through a common conductor without multiplexing switches, and computing a centroid of the finger being tracked with reference to the electrode having the maximum signal value and adjacent electrodes.

16. A method of tracking a finger used in conjunction with a touch sensitive device, the touch sensitive device comprising multiple electrodes and multiple sense circuits, the multiple electrodes being individually associated with one of at least a first electrode group and a second electrode group, at least one of the sense circuits being connected to more than one electrode through a common conductor, the electrodes configured to enable the finger to overlap multiple adjacent electrodes, the touch sensitive electrodes that share a sense circuit being spatially separated from each other by a dispersal distance large enough to prevent the finger from overlapping the touch sensitive electrodes that share a sense circuit, and the electrodes that share a sense circuit being associated with a different one of the first and second electrode groups, the method comprising:

scanning the multiple sense circuits to collect signal values corresponding to the multiple sense circuits, identifying, from the multiple sense circuits, a sense circuit having a maximum signal value and first and second electrodes that share the sense circuit having the maximum signal value, the first and second identified electrodes being spatially separated from each other by a dispersal distance and being associated with a different one of the first and second electrode groups, identifying one of the first and second identified electrodes as a touched electrode by comparing a signal strength of electrodes on either side of the first identified electrode with a signal strength of electrodes on either side of the second identified electrode, and computing a centroid of the finger being tracked with reference to the touched electrode.

17. The method of claim 16 wherein the multiple electrodes are arranged in a circle and a portion of the electrodes in the first group are adjacent other electrodes in the first group and a portion of the electrodes in the first group are adjacent electrodes in the second group.

18. A capacitive touch sensitive device configured to determine a position of a finger, the device comprising:

multiple electrodes arranged in an array, the multiple electrodes being individually associated with one of at least a first electrode group and a second electrode group, multiple sensor circuits, the multiple electrodes being greater in number than the multiple sensor circuits, individual sensor circuits being associated with at least two non-adjacent electrodes, the two non-adjacent electrodes being spaced by a dispersal distance equal to less than half of a first dimension and being associated with a different one of the first and second electrode groups, at least one of the sensor circuits being connected to more than one electrode through a common conductor, the electrodes being configured to enable the finger to overlap multiple adjacent electrodes and the dispersal distance being large enough to prevent the finger from overlapping the non-adjacent electrodes associated with the sensor circuit, the multiple sense circuits being configured to be scanned to collect a signal value corresponding to each of the multiple of sense circuits, wherein a sense circuit having a maximum signal value and first and second electrodes that share the sense circuit having the maximum signal value are identified, the first and second identified electrodes being spatially separated from each other by a dispersal distance and being associated with a different one of the first and second electrode groups, wherein one of the first and second identified electrodes is identified as a touched electrode by comparing a signal strength of electrodes on either side of the first identified electrode with a signal strength of electrodes on either side of the second identified electrode, and wherein a centroid of the finger being tracked is computed with reference to the touched electrode.

19. The device of claim 18 wherein the multiple electrodes are arranged in a circle and a portion of the electrodes in the first group are adjacent other electrodes in the first group and a portion of the electrodes in the first group are adjacent electrodes in the second group.

20. A capacitive touch sensitive device configured to determine a position of a finger, the device comprising:

multiple electrodes arranged in a circle, each multiple electrode being associated with a first electrode group or a second electrode group, a portion of the electrodes in the first group being adjacent other electrodes in the first group and a portion of the electrodes in the first group being adjacent electrodes in the second group, multiple sensor circuits, individual sensor circuits being associated with at least two non-adjacent electrodes spaced by a dispersal distance and associated with a different one of the first and second electrode groups, at least one of the sensor circuits being connected to more than one electrode through a common conductor, the electrodes being configured to enable the finger to overlap multiple adjacent electrodes and the dispersal distance being large enough to prevent the finger from overlapping the non-adjacent electrodes associated with the sensor circuit, the multiple sense circuits being configured to be scanned to collect a signal value corresponding to each of the multiple of sense circuits, wherein a sense circuit having a maximum signal value and first and second electrodes that share the sense circuit having the maximum signal value are identified, the first and second identified electrodes being spatially separated from each other by a dispersal distance and being associated with a different one of the first and second electrode groups, wherein one of the first and second identified electrodes is identified as a touched electrode by comparing a signal strength of electrodes on either side of the first identified electrode with a signal strength of electrodes on either side of the second identified electrode, and wherein a centroid of the finger being tracked is computed with reference to the touched electrode.

* * * * *